United States Patent [19]

Miyazawa

[11] Patent Number: 5,594,503
[45] Date of Patent: Jan. 14, 1997

[54] IMAGE INFORMATION COMPRESSING METHOD, COMPRESSED IMAGE INFORMATION RECORDING MEDIUM AND COMPRESSED IMAGE INFORMATION REPRODUCING APPARATUS

[75] Inventor: Takeo Miyazawa, Tokyo, Japan

[73] Assignee: Studio Gen Inc., Tokyo, Japan

[21] Appl. No.: 357,735

[22] Filed: Dec. 16, 1994

[30] Foreign Application Priority Data

Dec. 17, 1993 [JP] Japan ................................. 5-318147

[51] Int. Cl.$^6$ ................................. H04N 7/28
[52] U.S. Cl. .................. 348/414; 348/417; 348/418; 348/422
[58] Field of Search .................. 348/414, 417, 348/418, 422, 415, 407, 408, 409, 391, 384, 390, 699, 416; H04N 7/32

[56] References Cited

U.S. PATENT DOCUMENTS

| | | | |
|---|---|---|---|
| 4,710,812 | 12/1987 | Murakami et al. | 348/417 |
| 4,878,230 | 10/1989 | Murakami et al. | 348/417 |
| 5,008,748 | 4/1991 | Carr et al. | 348/417 |
| 5,103,488 | 4/1992 | Gemello et al. | 348/417 |
| 5,128,754 | 7/1992 | Dhein | 348/407 |
| 5,134,478 | 7/1992 | Golin | 348/415 |
| 5,150,209 | 9/1992 | Baker et al. | 348/407 |
| 5,267,334 | 11/1993 | Normille et al. | 348/409 |
| 5,444,488 | 8/1995 | Goubault et al. | 348/417 |
| 5,444,489 | 8/1995 | Truong et al. | 348/408 |

OTHER PUBLICATIONS

George Likourezos, "Prolog to Using Vector Quantization for Image Processing", Proc. of the IEEE, vol. 77, No. 10, Oct. 1993, pp. 1325–1341, 1993.

*Primary Examiner*—Tommy P. Chin
*Assistant Examiner*—Vu Le
*Attorney, Agent, or Firm*—Sughrue, Mion, Zinn, Macpeak & Seas

[57] ABSTRACT

An image information compressing method for densely compressing image information, in particular, dynamic image information, a compressed image information recording medium for recording compressed image information, and a compressed image information reproducing apparatus capable of reproducing compressed image information at high speed in a short time are provided. Each image frame constituting a dynamic image information is divided into key frames and movement compensation frames. The key frame is divided into blocks so that an image pattern of each block is vector-quantized by using a algorithm of the Kohonen's self-organizing featured mapping. The movement compensation frame is processed such that a movement vector for each block is determined and a movement vector pattern constituting a large block is vector-quantized by using the algorithm of the Kohonen's self-organizing featured mapping. The compressed image information recording medium includes an index recording region for recording the representative vector number of each block and large blocks and a representative vector recording region for recording information corresponding to a code book. The compressed image information reproducing apparatus includes a data reading unit, a key frame restoring unit and a movement compensation frame restoring unit.

6 Claims, 16 Drawing Sheets

| NUMBER S | REPRESENTATIVE VECTOR |
|---|---|
| 1 | $R_1 = (r_{11} \cdots r_{1n})$ |
| 2 | $R_2 = (r_{21} \cdots r_{2n})$ |
| ⋮ | ⋮ |
| M | $R_M = (r_{M1} \cdots r_{Mn})$ |

13 CODE BOOK

1

IMAGE INFORMATION COMPRESSING METHOD, COMPRESSED IMAGE INFORMATION RECORDING MEDIUM AND COMPRESSED IMAGE INFORMATION REPRODUCING APPARATUS

BACKGROUND OF THE INVENTION

1. Field of the Invention

This invention relates to a method of compressing image information, in particular, dynamic image information, a compressed image information recording medium, on which compressed image information is recorded, and a compressed image information reproducing apparatus for decompressing and reproducing image information recorded on the compressed image information recording medium.

2. Description of the Related Art

Apparatuses for converting analog image information into digital signals so as to record/reproduce the image information have been known. In this case, the digital image can be obtained by sampling and quantizing the analog signal, the digital image being composed of a predetermined number of vertical and horizontal pixels. Each pixel of the digital image is composed of 8 bits for each of RGB (red, green and blue) so that 256 signal levels for each color is expressed.

However, dynamic image information requires thirty image frames per second and thus a great information quantity must be used to express dynamic image information by digital signals. Therefore, a large memory capacity is required. Accordingly, a variety of methods capable of efficiently compressing digital image information has been developed. Among the various developed compressing methods, a method employing vector quantization can be available. The vector quantization of image information will now be described.

An assumption is made here that digital dynamic image information has been obtained from analog dynamic image information. Initially, each image frame of the digital dynamic image information is divided into a plurality of blocks. FIG. 18 illustrates the division of blocks of each image frame. For example, an image frame 1 composed of 640 vertical pixels (X=640) and 480 horizontal pixels (Y=480) is divided into blocks $2B_{ij}$ each of which is composed of 4 vertical pixel and 4 horizontal pixels (x=4, y=4). Each block $2B_{ij}$ is composed of 16 pixels, that is, 4 vertical pixels x 4 horizontal pixels. Each pixel 3 ($P_{ij}$) of each of the blocks 2 is scanned in a zigzag direction as shown in, for example, FIG. 19. As a result, an image pattern composed of 16 pixels for each block $B_{ij}$ is expressed by hexadecimal-dimensional vector $X=(x_1, x_2, \ldots, x_{16})$. Each component $x_1, x_2, \ldots, x_{16}$ of the vector X expresses signal levels of pixel $P_{11}, P_{21}, P_{12}, \ldots, P_{44}$ of the block $B_{ij}$.

FIG. 20 schematically illustrates distribution of block image pattern vectors in a signal space. A multiplicity of the thus-obtained image pattern vectors $X=(x_1, x_2, \ldots, x_k, \ldots, x_{16})$ is distributed in a hexadecimal signal space. FIG. 20 schematically illustrates the distribution. Assuming that each pixel of each of red, green and blue signals is expressed by 256 signal levels from 0 to 255, the image pattern vector $X=(x_1, x_2, \ldots, x_{16})$ of each block $B_{ij}$ for each signal is distributed in a hexadecimal dimensional cube signal space $(0 \leq x_1, x_2, \ldots, x_k, \ldots, x_{16} \leq 255)$ each side of which is 255. The hexadecimal dimensional cube that expresses the image pattern contains $255^{16}$ dots. It can be considered that some hundreds of relatively concentrated clusters $C_1, C_2, \ldots, C_l, \ldots$ are formed by the block image pattern vector.

The vector quantization is performed as follows: at least one representative vector $R_1, R_2, \ldots R_l, \ldots$ is selected with respect to each cluster $C_1, C_2, \ldots, C_l, \ldots$ so that a code book (a table of representative vectors) is made. Then, a representative vector nearest X is determined among the representative vectors contained in the code book with respect to the block image pattern vector X of each block $B_{ij}$ of each image frame. Thus, image information of each block is coded by means of the number of the determined representative vector. The foregoing process is the vector quantization.

When the vector quantization is performed as described above, the number of the representative vector can be expressed by, for example, 9 bits if an assumption is made that the number of the representative vectors contained in the code book is about some hundreds. Thus, the image information for each block can be compressed significantly. The compression realized by the vector quantization can be applied to compress a still image information as it is.

Another method using a movement compensation frame can be employed to compress dynamic image information. In a case where the movement compensation frame is used, for example, about 5 frames among 30 frames included in one second are used as key frames (frames for holding normal image information) and image frames between the key frames are used as movement compensation frames so that a state of movement of the image with respect to the key frames is described. The movement compensation frame is processed as follows.

Initially each movement compensation frame is divided into blocks Bij composed of a predetermined number of vertical and horizontal pixels as shown in FIG. 18. As shown in FIG. 21, vertical and horizontal movement compensation ranges 6a and 6b of a movement compensation range 4 around a block 5 ($B_{ij}$) of the movement compensation frame, that is being processed, are assumed to be $\pm v_0$ pixels. Furthermore, an assumption is made that movement vector 8 from block B (V) of the key frame immediately forward the movement compensation range 4 to a present frame block 5 is V. Therefore, if $V=(v_1, v_2)$, thus relationships $-v_0 \leq v_1$ and $v_2 \leq +v_0$ are held. As a result, with respect to pixel $P_{k1}$, ($P_{k1} \in B_{ij}$) constituting the present frame block 5 ($B_{ij}$), subscripts m and n of pixel $P_{mn}$ ($P_{mn} \in B$ (V)) constituting the key frame block 7 (B (V)) can be obtained from $m=k-v_1$ and $n=l-v_2$, respectively.

Then, from among the key frame blocks 7 (B (V)) contained in the movement compensation range 4 of the blocks 5 ($B_{ij}$) of the present compensation frame, a block 7 having an image pattern nearest the image pattern of the present frame block 5 ($B_{ij}$) is determined. The vector V of the block 7 (B (V)) is used as the movement vector 8 of the present frame block 5 ($B_{ij}$). When image information of the movement compensation frame is reproduced, the movement vector $V=(v_1, v_2)$ of each block $B_{ij}$ is used in such a manner that the pixel $P_{mn}$ of the block B (V) corresponding to the key frame 7 immediately forward the movement compensation frame containing the present frame block 5 ($B_{ij}$), which is being produced, is determined with respect to each $P_{k1} \in B_{ij}$ by using $m=k-v_1$ and $n=l-v_2$. Then, the image pattern of the block 7 B (V) of the key frame is reproduced as the pattern of the present frame block 5 ($B_{ij}$).

Also in the case where the movement compensation frame is used for the dynamic image information, the image information of the key frame can be compressed by the foregoing vector quantization method. In a case where the block 7 B (V) of the key frame of the movement compensation range satisfactorily matching with the present frame block 5 ($B_{ij}$) of the movement compensation frame is not present, the image pattern of the present frame block 5 ($B_{ij}$) can be vector-quantized to compress the same similarly to the key frame.

The vector quantization enables image information to be compressed significantly. However, the vector quantization requires a code book which is processed by determining the representative vector $R_i$ of each cluster $C_i$ formed by the distribution of the sample block image pattern vectors. As an algorithm for determining the representative vector, the LBG algorithm has been used for example. However, vector quantization of a hexadecimal dimensional vector block image pattern, each element of which has 256 levels, takes an excessively long time. The technological level of the present computer cannot perform the foregoing vector quantization.

Although use of the movement compensation frame to compress dynamic image information is an effective compressing method, the compression degree is limited. In order to record dynamic image information composed of an natural image, such as a moving picture, a large storage capacity is required. The present technological level cannot enable a portable reproducing apparatus comprising a ROM (a read-only memory), on which such dynamic image information can be recorded, to be obtained.

SUMMARY OF THE INVENTION

Accordingly, an object of the present invention is to provide an image information compressing method for densely compressing image information, in particular, dynamic image information, a compressed image information recording medium and a compressed image information reproducing apparatus.

According to one aspect of the present invention, there is provided an image information compressing method for compressing dynamic image information composed of a plurality of image frames, the method of compressing image information comprising the steps of:

(a) determining a plurality of image frames constituting the dynamic image information as key frames or movement compensation frames;

(b) dividing the plurality of image frames into a plurality of blocks each of which is composed of a predetermined number of pixels in a vertical direction and those in a horizontal direction;

(c) determining a movement vector of each block of the movement compensation frame determined in the step (a) with respect to an immediately forward key frame;

(d) dividing each of the movement compensation frames into large blocks each of which is composed of a predetermined number of the blocks in the vertical direction and those in the horizontal direction so as to obtain a plurality of movement vector pattern vectors by scanning each of the large blocks;

(e) determining a plurality of representative vectors that represent the plurality of movement vector pattern vectors obtained in the step (d) so as to make a code book for vector-quantizing the movement compensation frame of the dynamic image information; and (f) selecting one representative vector that represents the movement vector pattern vector obtained in the step (d) from the code book made in the step (e) to code the movement vector pattern vector with the number of the selected representative vector.

It is preferable that step (e) comprises the steps of:

(e1) initializing load vectors for respectively connecting, to the units, input vectors of the same dimension as the dimension of the sample movement vector pattern vector that are load vectors of a plurality of units disposed at lattice points in a space of three or more dimensions;

(e2) calculating the distance from one of the movement vector pattern vectors obtained in step (d) to each of the load vectors;

(e3) determining a winner unit that gives a minimum value of the distances calculated in step (e2) to update the load of a unit in the neighborhood of the winner unit; and (e4) repeating steps (e2) and (e3) for the plurality of movement vector pattern vectors to make the code book, the representative vector of which is the load vector of each unit obtained due to the repetition.

Each of the key frames determined in step (a) is subjected to a process comprising the steps of:

(g) dividing the plurality of key frames into a plurality of blocks each of which is composed of a predetermined number of pixels in a vertical direction and those in a horizontal direction;

(h) scanning each block of each of the key frames to obtain a block image pattern vector;

(i) initializing load vectors for respectively connecting, to the units, input vectors of the same dimension as the dimension of the block image pattern vector that are load vectors of a plurality of units disposed at lattice points in a space of three or more dimensions;

(j) calculating the distance from one of the block image pattern vectors obtained in step (h) to each of the load vectors;

(k) determining a winner unit that gives a minimum value of the distances calculated in step (j) to update the load of a unit in the neighborhood of the winner unit;

(l) repeating steps (j) and (k) for the plurality of block image pattern vectors to determine a load vector of each unit obtained due to the repetition as a representative vector so as to make a code book for vector-quantizing image information of the key frame; and (m) selecting a representative vector that represents the block image pattern vector of each block of the key frame from the code book to code the block image pattern vector with the number of the selected representative vector.

According to another aspect of the present invention, there is provided an image information compressing method for compressing image information composed at least one image frame, the image information compressing method comprising the steps of:

(o) dividing a plurality of sample image frames into a plurality of blocks each of which is composed of a predetermined number of pixels in a vertical direction and those in a horizontal direction;

(p) scanning each block of the sample image frames to obtain a plurality of sample block image pattern vectors of a predetermined dimension;

(q) initializing load vectors for respectively connecting, to the units, input vectors of the same dimension as the dimension of the sample block image pattern vector that are load vectors of a plurality of units disposed at lattice points in a space of three or more dimensions;

(r) calculating the distance from one of sample block image pattern vectors obtained in step (p) to each load vector;

(s) determining a winner unit that gives a minimum value of the distances calculated in step (r) to update the load of a unit in the neighborhood of the winner unit;

(t) repeating steps (r) and (s) for each sample block image pattern vector and selecting the thus-obtained load vector of each unit as a representative vector to make a code book for vector-quantizing the image information; and (u) vector-quantizing the image frame of the image information by using the code book to code the image frame.

According to another aspect of the present invention, there is provided a compressed image information recording medium for recording dynamic image information compressed by the image information compressing method according to claim 3, the compressed image information recording medium comprising:

an index recording region for recording the representative vector number determined in steps (f) and (m); and a representative vector recording region for recording the code book made in steps (e) and (l) at predetermined addresses thereof.

According to another aspect of the present invention, there is provided a compressed image information reproducing apparatus for reproducing dynamic image information recorded on the compressed image information recording medium according to claim 5, the compressed image information reproducing apparatus comprising:

vector number reading means for reading a representative vector number recorded on the index recording region;

representative vector component address calculating means for calculating a representative vector component address corresponding to the representative vector number of the code book in accordance with the representative vector number read by the vector number reading means;

representative vector component information reading means for reading a representative vector component corresponding to the representative vector component address calculated by the representative vector component address calculating means;

key frame restoring means for restoring a key frame in accordance with the representative vector component read by the representative vector component information reading means; and movement compensation frame restoring means for restoring a movement compensation frame in accordance with the representative vector component read by said representative vector component information reading means.

The dynamic image information compressing method according to the present invention has the steps of (d) dividing each of the movement compensation frames into large blocks each of which is composed of a predetermined number of the blocks in the vertical direction and those in the horizontal direction so as to obtain a plurality of movement vector pattern vectors by scanning each of the large blocks; (e) determining a plurality of representative vectors that represent the plurality of movement vector pattern vectors obtained in the step (d) so as to make a code book for vector-quantizing the movement compensation frame of the dynamic image information; and (f) selecting one representative vector that represents the movement vector pattern vector obtained in the step (d) from the code book made in the step (e) to code the movement vector pattern vector with the number of the selected representative vector. Therefore, information of the movement compensation frame can be compressed densely.

At this time, step (e) is realized by the algorithm of the Kohonens self-organizing featured mapping to be performed in steps (e1) to (e4) so that the representative vector is efficiently determined and the code book can be made while necessitating an allowable quantity of calculations.

In steps (g) to (m), each key frame is vector-quantized so that also image information of the key frame is efficiently compressed.

In a case where a still image information is compressed, the image information compressing method according to the present invention uses the algorithm of the Kohonen's self-organizing featured mapping to vector-quantize image information. As a result, the representative vector can be efficiently determined and the code book can be made while necessitating an allowable quantity of calculations.

The compressed image information recording medium according to the present invention records dynamic image information compressed by the image information compressing method according to the present invention.

The compressed image information reproducing apparatus according to the present invention, at high speed, decompresses the dynamic image information recorded on the compressed image information recording medium according to the present invention and reproduces the same in a short time.

DESCRIPTION OF THE PREFERRED EMBODIMENT

Figure 1:
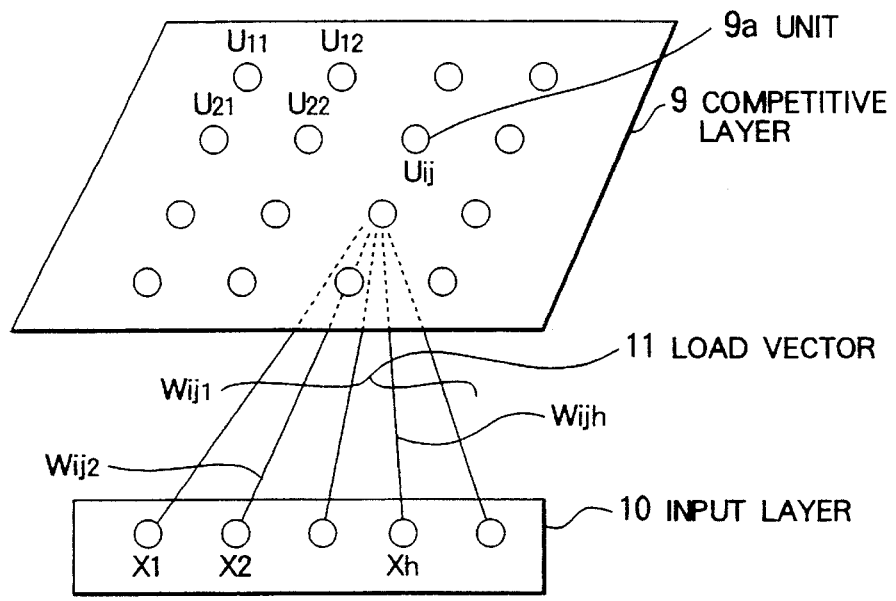
FIG. 1 is a schematic view which illustrates a Kohonen's neural network model for use to determine a representative vector at the time of performing vector quantization.

Referring to the drawings, an embodiment of a method of compressing dynamic image information will now be described. An assumption is made here that digital dynamic image information has been obtained by sampling and quantizing natural-color analog dynamic image information. The dynamic image information is composed of image frames, each image frame being composed of three types of signals, such as RGB (red, green and blue) signals, YIQ (brightness signal Y and hue signal IQ) signals or YUV signals (brightness signal Y and hue signal UV). In this embodiment, the image frame is composed of the YUV signals.

Figure 18:
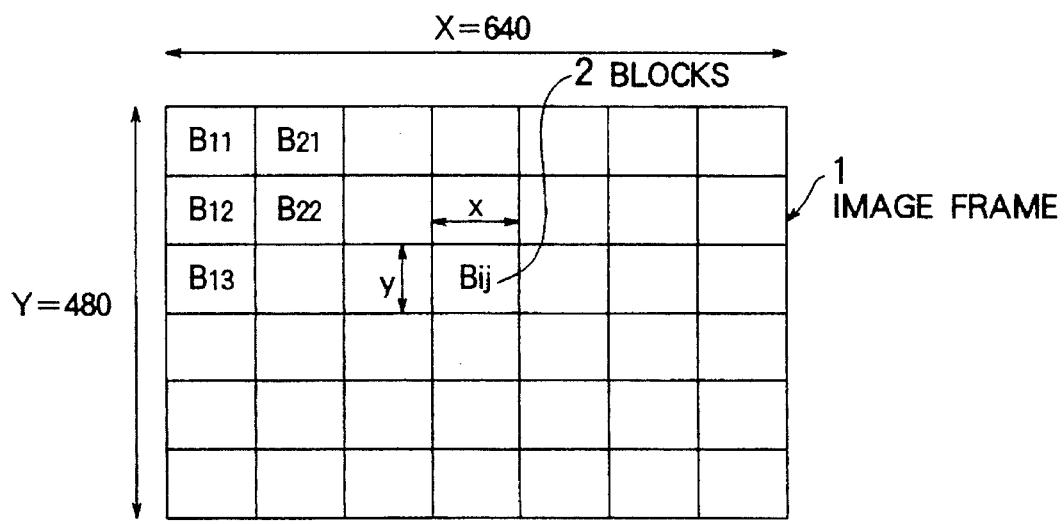
FIG. 18 is a diagram which illustrates block division of each image frame.

As shown in FIG. 18, brightness signal Y of each image frame 1 is composed of X (vertical direction)=640 pixels Y (horizontal direction)=480 pixels. A fact has been known that a person has a sharp sense of sight with respect to detailed portions of a bright and dark image and dim sense with respect to detailed portions of a color image. Therefore, the resolution of each of the hue signals U and V is lowered to the half of the brightness signal Y, and the image frame 1 is composed of X=320 pixels and Y=240 pixels. Therefore, 2 2 =4 pixels of signal Y correspond to one pixel of each of the signals U and V. Note that conversion from RGB (red, green and blue) signals to YUV signals and that from YUV signals to RGB (red, green and blue) signals can be performed by a known linear conversion method.

An assumption is made in this embodiment that dynamic image information is composed of 30 frames for each second. Assuming that each frame contains signals Y, U and V and that digital dynamic image information, in which signal Y is composed of 640×480 pixels and each of signals U and V is composed of 320×240 pixels, has been obtained. Then, the method of compressing the foregoing digital dynamic image information will now be described. Note that each pixel of the signals Y, U and V expresses 256 signal levels by, for example, 8 bits. In this embodiment, about 5 frames among 30 frames contained in one second are used as the key frames and the other frames are used as the movement compensation frames. The method of determining the key frames and the movement compensation frames will be described later.

The image information of the key frames is compressed by vector quantization. The representative vector for use in the vector quantization is determined by a novel algorithm found from the investigation of neural network, that is, an algorithm of the self-organizing featured mapping developed by T. Kohonen. With this, the representative vector is efficiently determined so that the code book is made. Also the vector quantization of the key frames can be used to compress a still image information.

On the other hand, the image information of the movement compensation frame is compressed by initially dividing each frame into blocks to determine the movement vector of each block, by then vector-quantizing the movement vector pattern of a large block consisting of a plurality of blocks. Thus, dense information compression can be realized. Also in the vector quantization in this case, the self-organizing featured mapping developed by T. Kohonen is employed.

Initially, compression of image information of the key frame will now be described in detail. The compression of the image information of the key frame is performed by the following steps:

(1) A learning sequence of a block image pattern is made;

(2) The learning sequence is presented to the Kohonen's neural network model to select a representative vector of the block image pattern so that a code book is made; and (3) A representative vector of the block image pattern nearest the image pattern of the block $B_{ij}$ of each key frame is selected from the code book so that the image pattern of each block $B_{ij}$ is coded by the representative vector in the code book.

The procedures (1) to (3) will now be described in detail.

Figure 19:
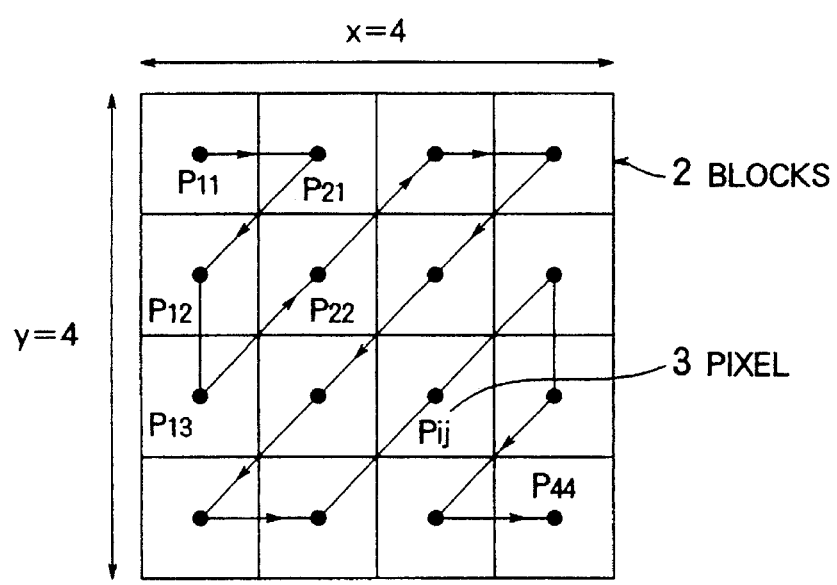
FIG. 19 is a diagram showing the operation order of each block.

The process (1) for making the learning sequence of the block image pattern is performed as follows: for example, each frame of signal Y is composed of 640×480 pixels (see FIG. 18). The frame composed of 640×480 pixels is divided into blocks Bij each of which is composed of 4×4 pixels, and is zigzag-scanned as shown in FIG. 19 so that the following hexadecimal dimensional block image pattern vector for each block is obtained:

$$X=(x_1, x_2, \ldots, x_k, \ldots, x_{16})$$

where respective components $x_1, x_2, \ldots, x_k, \ldots, x_{16}$ of vector X are levels of signal Y of the corresponding pixels. By obtaining image pattern vector X of each block of a multiplicity of frames, learning sequence X (t) can be obtained, in which the parameter t is an integer satisfying 0≤t<T, and T is the number of the image pattern vectors which is, for example, about 20,000.

Also signals U and V are subjected to a similar process in which each frame is divided into blocks each of which is composed of 4×4 pixels so that the learning sequence X (t) of the block image pattern for each of the signals U and V is obtained.

If the signal of each pixel of each signal is an 8-bit signal and it can be quantized into 256 levels, each vector of the learning sequence expressed as $$X(t)=(x_1(t), \ldots, x_{16}(t))$$

is distributed in a signal space composed of the following hexadecimal dimensional cube one side of which is 255:

$$0 \leq x_1, x_2, \ldots, x_k, \ldots, x \leq 255$$

Figure 20:
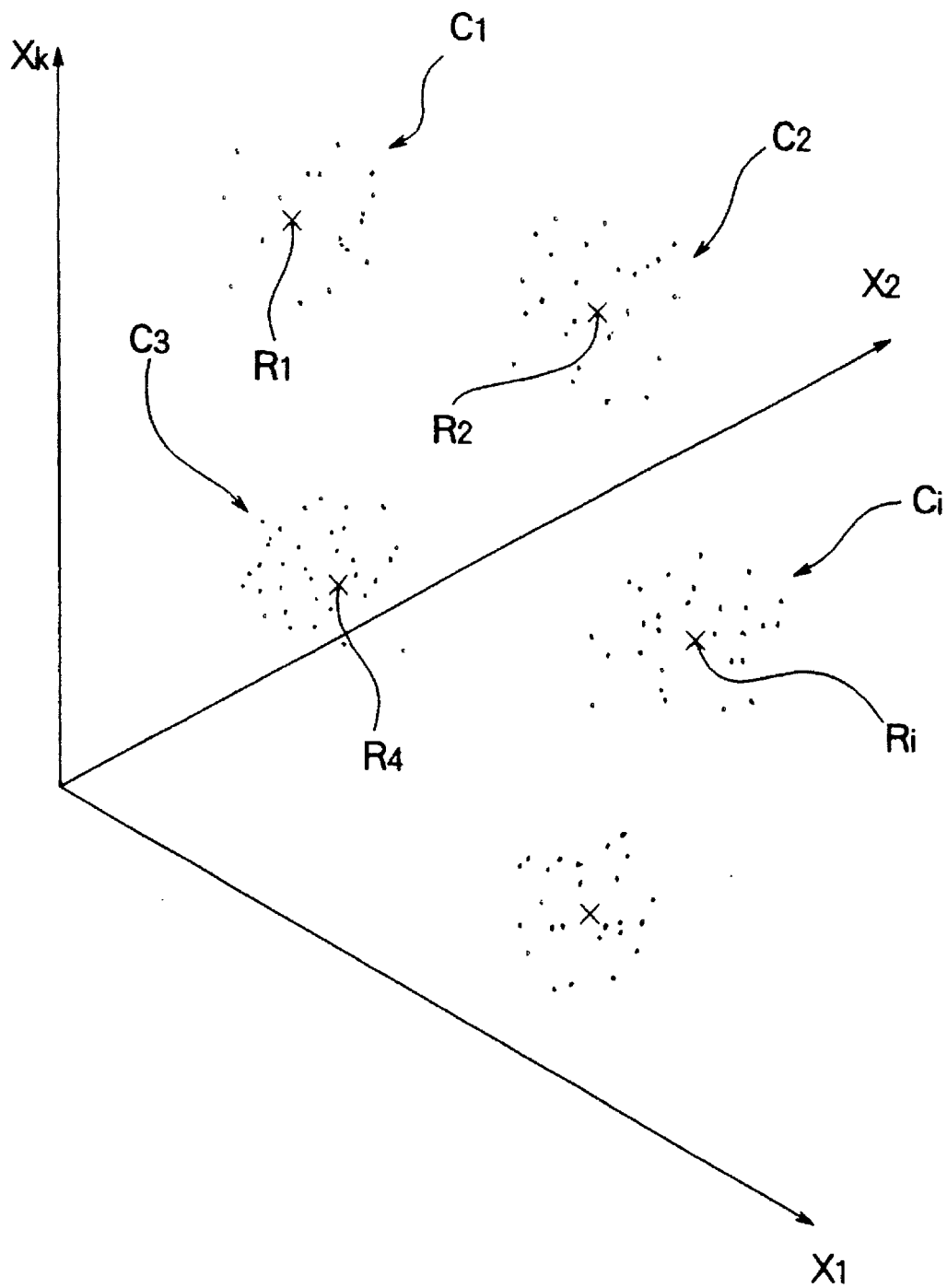
FIG. 20 schematically illustrates distribution of block image pattern vectors in a signal space.

It can be considered that the vector X (t) of the hexadecimal dimensional cube forms some hundreds of clusters as shown in FIG. 20.

Note that previous normalization of the distribution of the learning sequence X (t) enables the process (2) for determining the representative vector to be performed efficiently.

Then, the process (2) for selecting the representative vector using the Kohonen's neural network model and for making the code book will now be described. FIG. 1 is a schematic view which illustrates the Kohonen's neural network model for use to determine the representative vector at the time of performing the vector quantization. Although a three-dimensional neural network is used, FIG. 1 illustrates a two-dimensional neural network. The neural network is composed of a competitive layer 9 and an input layer 10. In the two-dimensional neural network shown in FIG. 1, each neuron and unit 9a ($U_{ij}$) of the competitive layer 9 is disposed at a lattice point on the plane (that is, at an integer coordinate point (i, j) on the plane). Each unit 9a ($U_{ij}$) is connected to the following input vector constituting the input layer 10:

$$X=(x_1, x_2, \ldots, x_h, \ldots)$$

through load vector 11

$$W_{ij}=(w_{ij1}, w_{ij2}, \ldots, w_{ijh}, \ldots).$$

That is, each unit Uij is connected to the first input component x through the load $w_{ij1}$, connected to the second input component $x_2$ through the load $w_{ij2}$, and connected to the h-th input component xh through the load wijh. Although only the load for the unit $U_{ij}$ is illustrated in FIG. 1, other units are similarly connected to the input layer 10.

As described later, the algorithm of the Kohonen's self-organizing featured mapping sequentially presents the learning sequence vectors as inputs to the neural network to update the load of each unit so as to develop the load vector of each unit of the neural network in the signal space. The thus-determined load vector of each unit is used as the representative vector for use in the vector quantization. That is, the foregoing load vectors determined finally are used to make the code book.

Hitherto, the algorithm of the Kohonen's self-organizing featured mapping usually uses the two-dimensional neural network arranged as shown in FIG. 1. However, if the two-dimensional neural network is employed, the disposition of the units 9a constituting the competitive layer 9 are twisted undesirably and, therefore, the development of the neural network formed by the units 9a in the signal space will be inhibited undesirably. If such twist takes place, an adequate representative vector for each cluster cannot be determined. Accordingly, a three or more dimensional neural network is used in the present invention. In particular, a three-dimensional neural network is used in this embodiment.

The three-dimensional neural network is composed of units Uijk disposed at lattice points in the three-dimensional space, that is, integer coordinate points (i, j, k) in the space. Each unit $U_{ijk}$ is connected to the following input vector:

$$X=(x_1, x_2, \ldots, x_{16})$$

through the following load vector:

$$w_{ijk}=(w_{ijk1}, w_{ijk2}, \ldots, w_{ijkh}, \ldots, w_{ijk16}).$$

That is, units $U_{ijk}$ are connected to the following input components:

$$x_1, x_2, \ldots, x_h, \ldots, x_{16}$$

through $w_{ijk1}, w_{ijk2}, \ldots, w_{ijkh}, \ldots, w_{ijk16}$.

Each cluster constituting the learning sequence vector X (t) must be represented by at least one unit. In the algorithm of the Kohonen's self-organizing featured mapping, load vectors of a plurality of units usually correspond to one cluster. Therefore, the number of the units must be determined to be relatively larger with respect to the number of the clusters. In this embodiment, the following relationship is employed:

$$1 \leq i, j, k \leq 8$$

Therefore, the number of the units constituting the neural network is 8 8 8=512. The foregoing unit $U_{ijk}$ is, through the following loads:

$$W_{ijk}=(w_{ijk1}, w_{ijk2}, \ldots, w_{ijkh}, \ldots, w_{ijk16})$$

connected to the following input vector:

$$X=(x_1, x_2, \ldots, x_h, \ldots, x_{16}).$$

By presenting the learning sequence X (t) obtained in (1) as the input vector, the load $W_{ijk}$ of each unit $U_{ijk}$ is sequentially updated so that the representative vector is determined.

Figure 2:
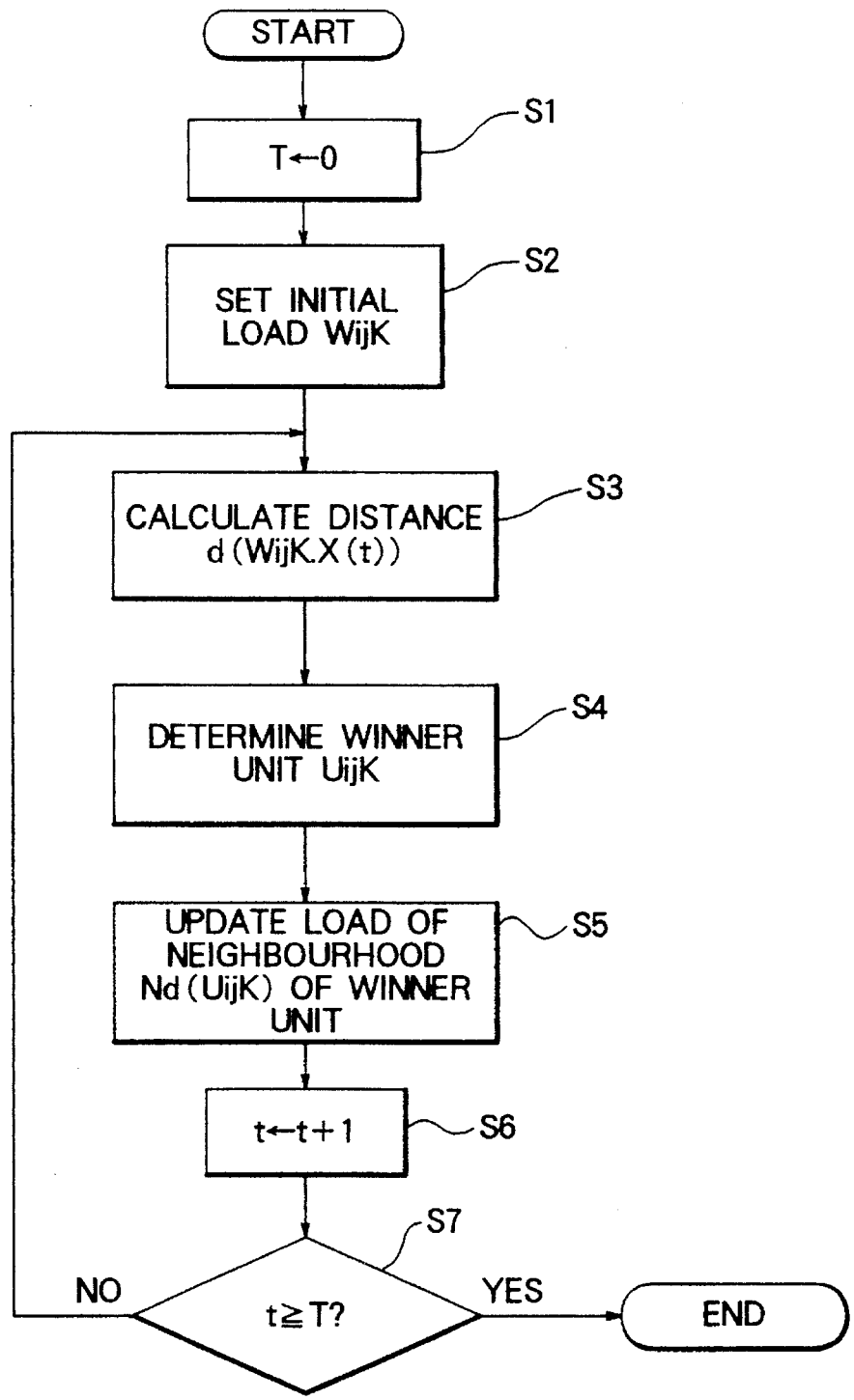
FIG. 2 is a flow chart showing a procedure of a self-organizing featured mapping for determining a representative vector for the vector quantization by using the Kohonen's neural network model.

FIG. 2 is a flow chart showing the procedure of the self-organizing featured mapping for determining the representative vector in the vector quantization by using the Kohonen's neural network model. Referring to FIG. 2, the procedure for determining the representative vector by using the algorithm of the Kohonen's self-organizing featured mapping will now be described.

In step S1 learning sequence parameter t is initialized (t←0, where symbol ← represents substitution of a value into the parameter in a procedure-type program language). In step S2 the following load vector of each unit $U_{ijk}$ is initialized:

$$W_{ijk}=(w_{ijk1}, w_{ijk2}, \ldots, w_{ijkh}, \ldots, w_{ijk16}).$$

The initialization of the load $W_{ijk}$ is performed by, for example, distributing, by means of a random number, in the vicinity of the center of a hexadecimal dimensional cube whose one side is 255 in which the learning sequence vector X (t) is distributed. That is, the h-th component $W_{ijk}$ of the load vector $W_{ijk}$ for each h ($1 \leq h \leq 16$) is set such that:

$$W_{ijkh}=127.5 \pm \epsilon$$

where $\epsilon$ is a random number smaller than 255×0.1=25.5.

In step S3 the following distance from the vector X (t) of the learning sequence and the load vector $W_{ijk}$ of each unit $U_{ijk}$ is calculated:

$$d(W_{ijk}, X(t))$$

The distance d ($W_{ijk}$, X (t)) is defined by the following square root $\sqrt{\Sigma(Wijkh-x_h(t))^2}$ of $\Sigma (w_{ijkh}-x_h(t))^2$, where $\Sigma$ is the sum of the subscript h ranging such that $1 \leq h \leq 16$.

In step S4 the winner unit, that is, unit $U_{ijk}$ that minimizes the following distance calculated in step S3 is determined:

$$d(W_{ijk}, X(t)).$$

In step S5 load vector $W_{lmn}$ of all units $U_{lmn}$ contained in the neighborhood $N_d(U_{ijk})$ (a cube, the length of one side of which is $2d$ and which is formed relative to unit $U_{ijk}$) of the winner unit $U_{ijk}$ is updated as follows.

Figure 3:
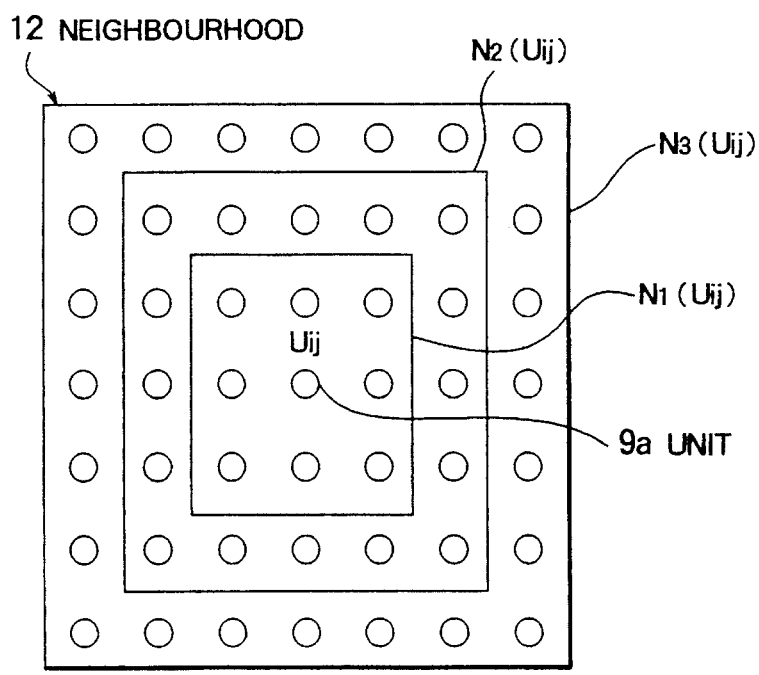
FIG. 3 is a diagram which illustrates a square neighborhood of a two-dimensional neural network unit $U_{ij}$.

FIG. 3 is a diagram which illustrates square neighborhoods of a unit $U_{ij}$ of a two-dimensional neural network. Neighborhoods $N_d(U_{ij})$ (squares, the length of one side of which is $2d$ and which is formed relative to the unit $U_{ij}$) consists of all units $U_{1m}$ that satisfy the following relationships:

$$i-d \leq 1 \leq i+d, \text{ and}$$

$$j-d \leq m \leq j+d.$$

FIG. 3 illustrates neighborhoods 12 expressed as Nd ($U_{ij}$) in a case where d=1, 2 and 3.

Also neighborhoods $N_d(U_{ijk})$ (a cube, the length of one side of which is $2d$) of units $U_{ijk}$ of a three-dimensional neural network are defined by a set of units $U_{1mn}$ that satisfy the following relationships:

$$i-d \leq 1 \leq i+d,$$

$$j-d \leq m \leq j+d, \text{ and}$$

$$k-d \leq n \leq k+d.$$

Note that the subscript parameter d indicating the size of the neighborhood $N_d(U_{ijk})$ in step S5 is set with respect to the value of the learning sequence parameter t as follows:

$$d = d_0(1-(t/T))$$

where $d_0$ is, for example, the half of one side of the neural network. That is, $d_0$ is as follows in this embodiment:

$$d_0 = (8-1)/2 = 3.5.$$

In step S5 shown in FIG. 2, the load vector $W_{lmn}$ of the unit $U_{lmn}$ contained in the neighborhood $N_d(U_{ijk})$ of the winner unit $U_{ijk}$ is performed in such a manner that each component of the load vector $W_{lmn}$ is updated as follows:

$$w_{lmnh} \leftarrow w_{lmnh} + a(x_h(t) - w_{lmnh}).$$

where $\alpha$ is a coefficient expressed by using the learning sequence parameter t as follows:

$$a = a_0(1-(t/T))$$

where $a_0$ is 0.2 to 0.5 and $x_h(t)$ is the h-th component of the following learning sequence vector X (t):

$$X(t) = (x_1(t), \ldots, x_h(t), \ldots, x_{16}(t)).$$

After updating of the load vector of the neighborhood units of the winner unit $U_{ijk}$ has been completed as described above, the value of the learning sequence parameter t is updated as follows in step S6:

$$t \leftarrow t+1$$

In step S7 whether or not all learning sequence vector X (t) have been processed, that is, whether or not the following relationship has been satisfied is discriminated:

$$t \geq T.$$

If non-processed learning sequence vectors are left, the operation returns to step S3 and the operations in step S3 to S7 are repeated. If a discrimination has been made in step S7 that all learning sequence vectors X (t) have been processed, the procedure shown in FIG. 2 is completed.

In the procedure shown in FIG. 2, whenever step S5 is performed, the load vectors $W_{lmn}$ of all units $U_{lmn} \in N_d(U_{ijk})$ with respect to the winner unit $U_{ijk}$ (that is, the nearest unit with respect to the presented learning sequence input vector X (t) are pulled toward the input vector X (t) so that updating approaching the input vector X (t) is performed. As a result, the load vectors $W_{ijk}$ of the units $U_{ijk}$ of the neural network are gradually developed in the signal space in accordance with the distribution of the clusters (refer to FIG. 20) formed by the learning sequence X (t). After the procedure shown in FIG. 2 has been completed, the load vectors of at least one unit represent clusters forming the vector X (t) of the learning sequence. Therefore, the load vectors $W_{ijk}$ are arranged in an adequate order so that the code book of the vector quantization can be obtained.

$$R_1 = (r_{11}, \ldots, R_{1n})$$

$$R_2 = (r_{21}, \ldots, R_{1n})$$

$$\ldots$$

$$R_M = (r_{m1}, \ldots, R_{Mn})$$

where n=16 and M=512. By setting as follows:

$$s = i + 8 \cdot j + 64 \cdot k$$

and by setting as follows:

$$R_s = W_{ijk}$$

where $r_{s1} = w_{ijk1}, \ldots, r_{sn} = w_{ijkn}$. Thus, a code book can be made in which the load vectors $W_{ijk}$ of each unit $U_{ijk}$ are arranged in a predetermined order. In this case, the following parameter is used as the number of the representative vector $W_{ijk}$.

$$s = i + 8 \cdot j + 64 \cdot k$$

Figures 4, 5:
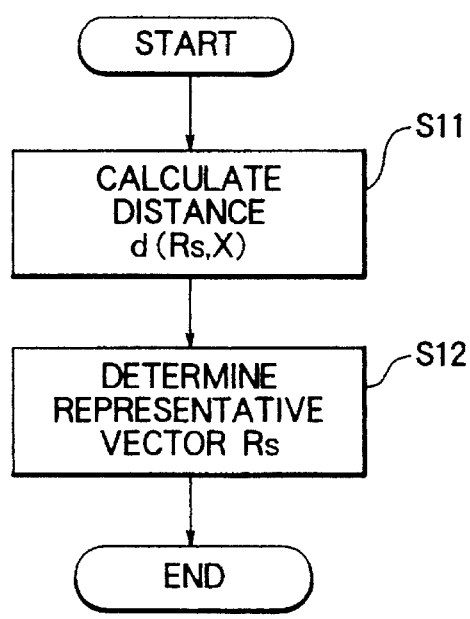
FIG. 4 is a table showing a code book obtainable by adequately arranging load vectors $W_{ijk}$ determined by the procedure shown in FIG. 2.
FIG. 5 is a flow chart showing a procedure for selecting a representative vector $R_i$ for coding an image pattern vector X of each block by using the code book shown in FIG. 4.

FIG. 4 is a table showing a code book obtainable by adequately arranging the load vectors $W_{ijk}$ determined by the procedure shown in FIG. 2. A code book 13 gives the component of a representative vector that corresponds to each number s of the representative vector. The code book as shown in FIG. 4 is made for each of signals Y, U and V by the procedure shown in FIG. 2.

Thus, the description of the procedure (2) for making the code book is completed. Then, the vector quantization procedure (3) will now be described in which a block image pattern representative vector nearest the block $B_{ij}$ of each key frame is selected from the code book so that the image pattern of each block $B_{ij}$ is coded by the representative vector number. The vector quantization procedure is performed as follows by using the code book shown in FIG. 4.

FIG. 5 is a flow chart showing a procedure for selecting representative vector $R_1$, with which the image pattern vector X of each block is coded, by using the code book shown in FIG. 4. Vector quantization of signal Y will now be described. The vector quantization is performed as follows by using the code book shown in FIG. 4. In step S11 the distance from the input pattern vector X, that is, the following block image pattern vector, the component of which is pixel signal level obtained by zigzag-scanning the pixel of each block $B_{ij}$ of the signal Y of the key frame:

$$X = (x_1, \ldots, x_{16})$$

to each representative vector $R_s$ of the code book of the signal Y is calculated:

$d(r_s, X)$ where $1 \leq s \leq M=512$. The distance $d(r_s, X)$ can be given from the following square root $\sqrt{\Sigma(r_{si}-x_i)^2}$ of $\Sigma (r_{si}-x_i)^2$, where $\Sigma$ is the sum of the subscript i ranging such that $1 \leq i \leq 16$.

In step S12 the representative vector R, that minimizes the distance $d(r_s, X)$ is selected as the representative vector of the input pattern vector X. Then, the input pattern vector X is coded with the number s of the representative vector. Since the number s of the representative vector is within the following range:

$1 \leq s \leq 512=2^9$ each block pattern X can be coded with 9 bits. Thus, the code book shown in FIG. 4 is used to code each block $B_{ij}$ with the number s of the corresponding representative vector so that the signal Y of the key frame is vector-quantized.

Also the signals U and V of the key frame are vector-quantized by using corresponding code books similarly to the vector quantization of the signal Y. Therefore, the image pattern of each block can be coded with the number of the representative vector of the corresponding code book for each of the YUV signals. Since each of the signals U and V are composed of 320×240 pixels, division into 4×4 blocks $B_{ij}$ causes the signal to be composed of 80×60=4800 blocks. On the other hand, the signal Y is composed of 640×480 pixels, the signal Y is composed of 160 120=19200 blocks each consisting of 4×4 pixels. Each key frame is coded with columns of the codes (the number s of the representative vector) determined for each block and the code book for each signal. The structure of a recording medium for recording the vector-quantized information and a method of reproducing the information will be described later.

A method of determining the configuration of the key frames and movement compensation frames will now be described. Whether or not each frame is made to be the key frame or the movement compensation frame is determined as follows: the first frame is made to be the key frame and the second and ensuing frames are subjected to a procedure shown in FIG. 6.

Figure 6:
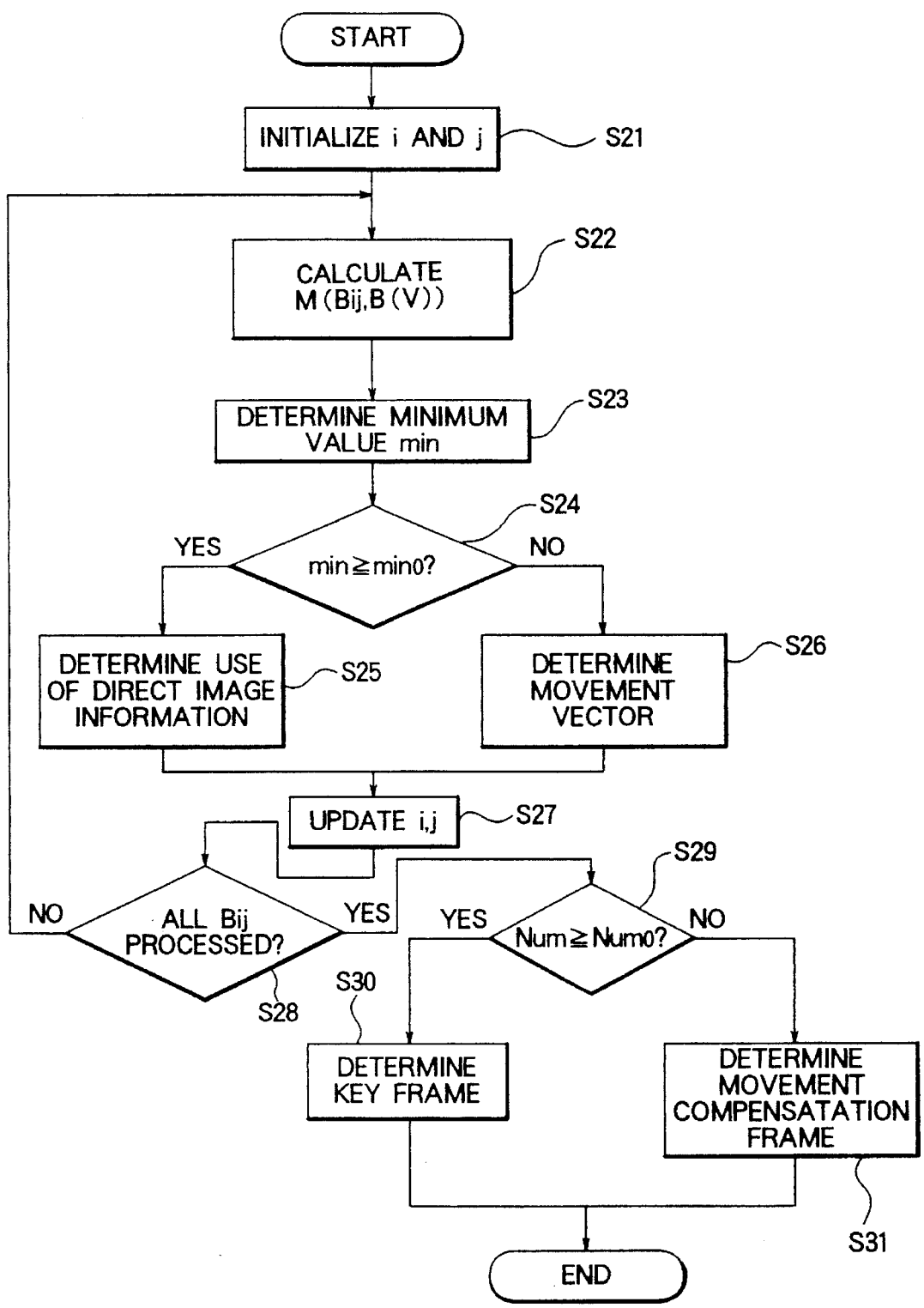
FIG. 6 is a flow chart showing a procedure for discriminating whether or not each frame is made to be a movement compensation frame.
Figure 21:
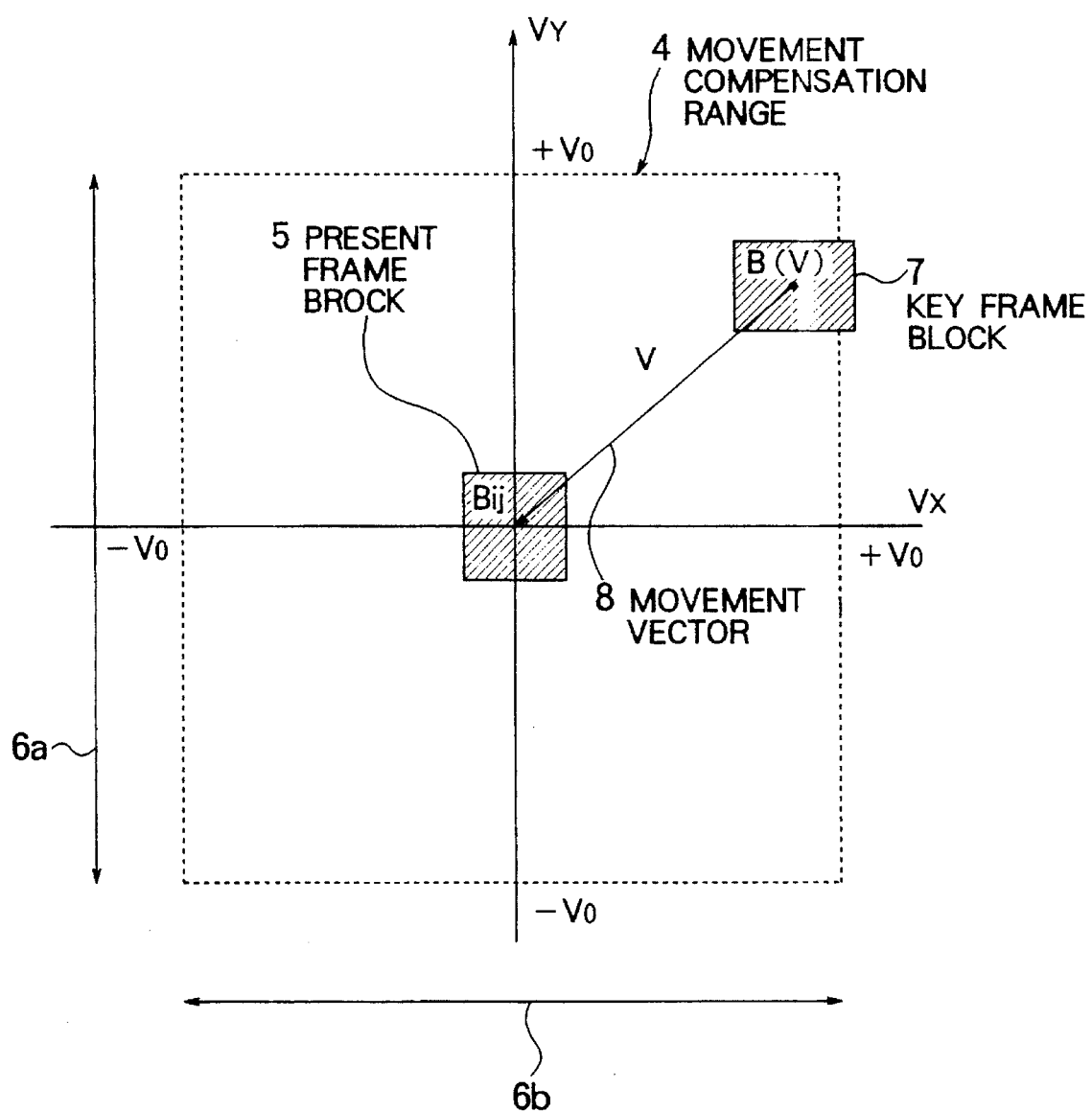
FIG. 21 schematically illustrates a movement vector and a movement compensation range.

The procedure shown in FIG. 6 is performed such that each frame (640×480 pixels) of the signal Y is divided into block $B_{ij}$ composed of 4×4 pixels (see FIG. 18). The frame of each of the signals U and V each of which is composed of 320×240 pixels is divided into blocks composed of 2×2 pixels. Therefore, the signals Y, U and V are divided into blocks disposed by the same number in the vertical and horizontal directions. In this division, the block $B_{ij}$ of the signal Y and the blocks of the subscripts (i, j) of the signals U and V correspond to the same image region. Therefore, in the foregoing division, the image region common to the signals Y, U and V positioned at the subscripts (i, j) is called the image block $B_{ij}$ ($1 \leq i \leq 160$, $1 \leq j \leq 120$). Furthermore, a vertical movement compensation range 6a and a horizontal movement compensation range 6b of the movement compensation range 4 are made to be $\pm v_0$ pixel in the frame of the signal Y (as for signals U and V, it corresponds to $v_0/2$ pixel) as shown in FIG. 21, for example, $v_0=32$ pixels.

After the foregoing preparation has been completed, the procedure shown in FIG. 6 is performed. In step S21 shown in FIG. 6, the subscript parameters i and j of the image block to be processed are initialized as follows:

$i \leftarrow 1, j \leftarrow 1$.

In step S22 the following coincidence evaluation function of each image block $B_{ij}$ of the present frame is calculated:

$M [B_{ij}, B(V)]$ where B (V) is a block of a key frame immediately before being contained in the movement compensation range 4, B (V) is a key frame block that causes a movement vector 8 from B (V) to the present frame block 5 to be as follows:

$V(v_1, v_2)$ where $-v_0 \leq v_1$ and $v_2 \leq +v_0$. Therefore, subscripts m and n of pixel $P_{mn}$ ($P_{mn} \in B(V)$) constituting the key frame block 7 (B (V)) with respect to pixel $P_{kl}$ ($P_{kl} \in B_{ij}$) constituting the present frame block 5 ($B_{ij}$) are given as follows:

$m=k-v_1$ and $n=l-v_2$

The following coincidence evaluation function is calculated for all key frame blocks 7 (B (V)) contained in the movement compensation range 4:

$M(B_{ij}, B(V))$

The coincidence evaluation function $M(B_{ij}, B(V))$ is defined, for example, as follows. An assumption is made that the pixel signal level of signal Y on the image block Bij of the present frame is as follows:

$Y_{11}, \ldots, Y_{44}$,

The pixel signal level of the signal Y is assumed to be as follows:

$U_{11}, \ldots, U_{22}$

The pixel signal level of the signal V is assumed to be as follows:

$V_{11}, \ldots, V_{22}$

Furthermore, the pixel signal level of the signal Y of the image block 7 (B (V)) of the forward key frame is made to be as follows:

$Y'_{11}, \ldots, Y'_{44}$

The pixel signal level of the signal U is made to be as follows:

$U'11, \ldots, U'22$

The pixel signal level of the signal V is made to be as follows:

$V'11, \ldots, V'22$

The coincidence evaluation function is, at this time, defined as follows:

$M(B_{ij}, B(V)) = \Sigma|Y_{pq}-Y'_{pq}|+\Sigma|U_{rs}-U'_{rs}|+\Sigma|V_{rs}-V'_{rs}|$ where the first $\Sigma$ is the sum of the subscripts p and q in the ranges of $1 \leq p$ and $q \leq 4$ and second and third $\Sigma$ are the sum of the subscripts r and s in the ranges of $1 \leq r$ and $s \leq 2$.

In step S23 the minimum value min of the coincidence evaluation function $M(B_{ij}, B(V))$ for the present frame block 5 ($B_{ij}$) of the present frame is determined. In step S24 whether or not the minimum value min is larger than a predetermined threshold $min_0$ is determined.

If the minimum value min of the coincidence evaluation function $M(B_{ij}, B(V))$ is larger than the predetermined threshold $min_0$, a discrimination is made that the matching key frame block 7 (B (V)) is not present in the movement compensation range. Therefore, the operation proceeds to step S25 in which the image block ($B_{ij}$) is, as it is, determined to be the block for image information (that is, the block that does not use the movement vector).

If a discrimination is made in step S24 that the minimum value is smaller than the predetermined threshold $min_0$, the process proceeds to step S26 in which the image block B (V) of the key frame that gives the minimum value is determined. Then, V=($v_1$, $v_2$) of the image block B (V) is determined to be the following movement vector of the image block $B_{ij}$:

$$V_{ij}=(V_{ij1}, V_{ij2})$$

Then, the operation proceeds to step S27 after steps S25 and S26. In step S27 the subscript parameters i and j of the image block to be processed are updated. In step S28 in which whether or not all present frame blocks 5 ($B_{ij}$) have been processed is discriminated. If non-processed image block is left, the operation returns to step S22, and steps S22 to 28 are repeated. Thus, whether or not the block B (V) of the matching key frame is present in the movement compensation range 4 is discriminated for all image blocks $B_{ij}$. If the block B (V) is present, the movement vector $V_{ij}=(v_{ij1}, v_{ij2})$ for each image block $B_{ij}$ is determined. After all image blocks $B_{ij}$ of the present frame have been processed, the operation proceeds from step S28 to step S29. If the matching key frame block 7 (B (V)) is not present in the movement compensation range 4, whether or not the number of the image block $B_{ij}$ (block using direct image information) Num is larger than predetermined threshold $Num_0$ is discriminated. If the number Num is larger than the predetermined threshold $Num_0$, the operation proceeds to step S30 in which the present frame is made to be the key frame. If the number is smaller than the predetermined threshold, the operation proceeds to step S31 in which the present frame is determined to be the movement compensation frame.

The foregoing procedure shown in FIG. 6 is repeatedly performed for each frame ensuing the second frame so that the subject frames are sequentially determined to be the key frame or the movement compensation frame. In order to occurrence of continuation of key frames, a predetermined number of frames (for example, three frames) immediately in the rear of the frame determined to be the key frame are forcibly made to be the movement compensation frames regardless of the result of the foregoing procedure.

The vector quantization of the key frame is performed as described above. Then, the vector quantization of the movement vector pattern of the movement compensation frame will now he described.

Figure 7:
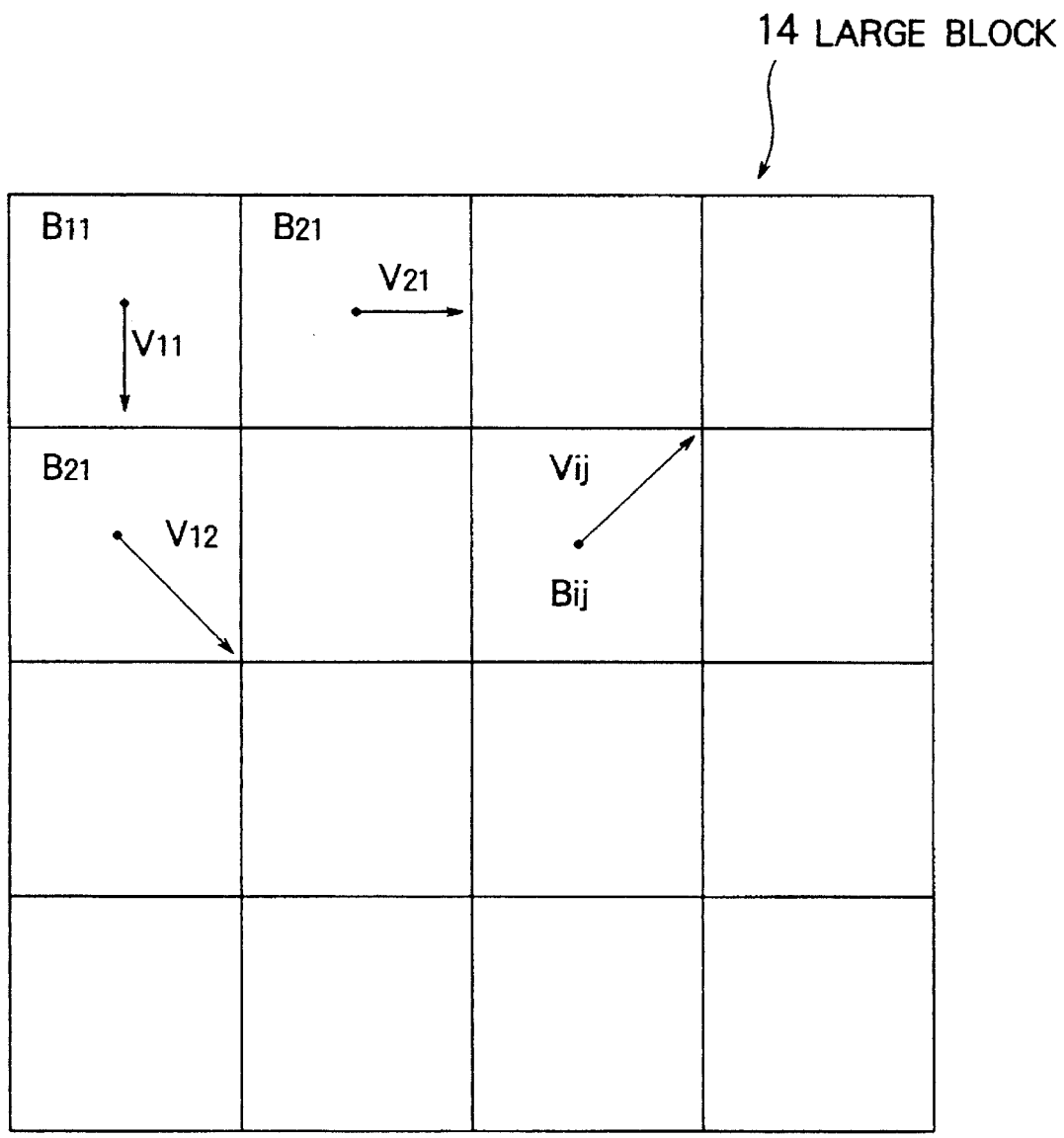
FIG. 7 is a schematic view which illustrates a large block $Z_{11}$, at the upper left corner of the movement compensation frame.

As described above, the movement compensation frame is divided into 160×120 image blocks $B_{ij}$ and the movement vector $V_{ij}$ has been determined for all image blocks $B_{ij}$ except a portion as a result of the procedure shown in FIG. 6. Then, four by four image blocks are integrated so that a large block $Z_{st}$ (1≦s≦40, 1≦t≦30) is formed. FIG. 7 is a schematic view which illustrates an upper left large block $Z_{11}$ of the movement compensation frame. However, if a block using a direct image information is present (refer to step S25 shown in FIG. 6) in the image block $B_{ij}$ constituting the large block 14 ($Z_{st}$), all image blocks $B_{ij}$ contained in the large block 14 are determined to be the blocks using the direct image information. As a result, each of the movement compensation frames is divided into the large block 14 ($Z_{st}$) composed of image blocks $B_{ij}$, the movement vector $V_{ij}$ of which has been determined, and the block $B_{ij}$ using the direction image information. The large block 14, the movement vector pattern of which has been determined, corresponds to an image region composed of 16 by 16 pixels the frame of the signal Y. On the other hand, the block using the image information corresponds to an image region composed 4 by 4 pixels of the signal Y.

The image block $B_{ij}$ using the direct image information of the movement compensation frame is vector-quantized by using the foregoing code book for each of the signals Y, U and V in accordance with the procedure shown in FIG. 5. The large block 14 ($Z_{st}$), the movement vector pattern of which has been determined as shown in FIG. 7, is vector-quantized as follows:

The components $v_{ij1}$ and $v_{ij2}$ of the movement vector $V_{ij}=(v_{ij1}, v_{ij2})$ of each image block $B_{ij}$ in the large block 14 $Z_{st}$ respectively are contained in the following range as $-v_0 \leq v_{ij1}$ and $v_{ij2} \leq +v_0$, where $v_0$ is, for example, 32. Therefore, the components $v_{ij1}$ and $v_{ij2}$ of each movement vector $V_{ij}$ can be expressed by 11 bits. By zigzag-scanning 16 image blocks $B_{ij}$ (similarly to the pixel scanning shown in FIG. 19) constituting the large block 14 ($Z_{st}$), the following 16×2 =32-dimensional movement vector pattern can be obtained:

$$X=(x_1, \ldots, x_h, \ldots, x_{32})$$

where each component $x_1, \ldots, x_h, \ldots, x_{32}$ of the vector X is the components of $v_{ij1}$ and $v_{ij2}$ of each movement vector $V_{ij}$, which is expressed by, for example, 11 bits.

Thus, a learning sequence X (t) composed of a multiplicity of movement vector pattern vectors X is made. The made learning sequence X (t) is presented to the Kohonen's neural network and the procedure similar to that shown in FIG. 2 is employed. Thus, the code book (see FIG. 4) for the movement vector pattern can be obtained. Furthermore, a procedure similar to that shown in FIG. 5 is employed to select a representative vector corresponding to each large block 14. With the number of the selected representative vector, the movement vector pattern of each large block 14 of the movement compensation frame is coded so that the large block of the movement compensation frame is vector-quantized.

Referring to FIGS. 8 to 13, a method of recording compressed dynamic image information in a ROM (Read-Only Memory) constituting a recording medium on which compressed dynamic image information is recorded will now be described.

Figure 8:
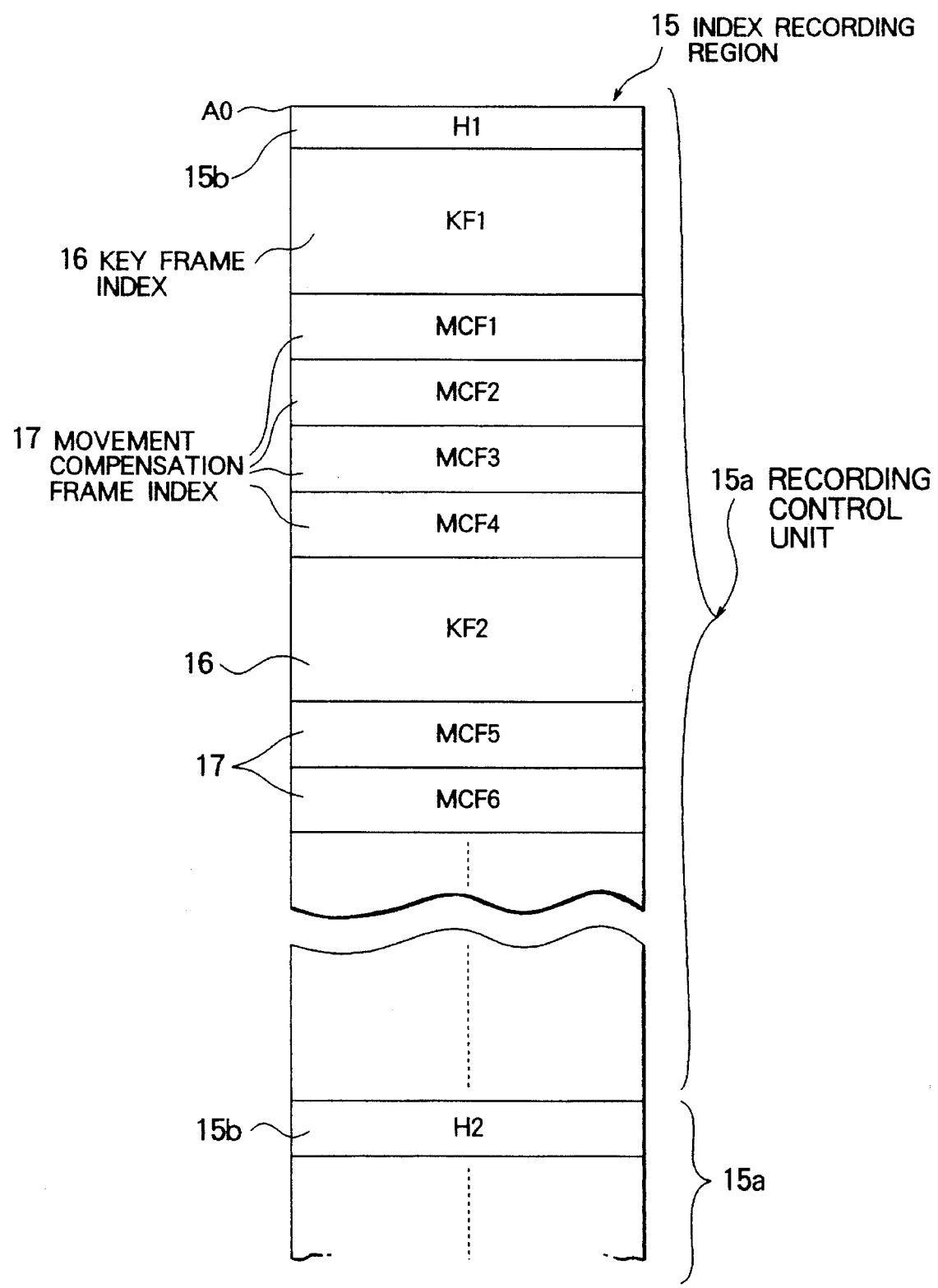
FIG. 8 is a block diagram which schematically illustrates an index recording region for recording the number of a representative vector for vector-quantizing the key frame and the movement compensation frame.

FIG. 8 is a block diagram which schematically illustrates an index recording region on which the number of the representative vector for vector-quantizing the key frame and the movement compensation frame is recorded. An index recording region 15 starts at a predetermined address $A_0$. As shown in FIG. 8, the index recording region 15 includes a multiplicity of recording control units 15a. Each recording control unit 15a is composed of 256 frame indexes (key frame indexes 16 and movement compensation frame indexes 17), the recording control unit 15a being controlled with a header 15b ($H_1$, $H_2$, . . . ). In the header 15b of each recording control unit 15a, the order of 256 controlled key frame indexes 16 and the movement compensation frame indexes 17 included in the controlled recording control unit 15a is recorded.

As described above, 30 frames are included for one second in this embodiment such that the key frame is disposed for every 5 frames. The intervals among the key frames are not constant. For example, six or seven movement compensation frames are sometimes disposed between key frames, or only three or four movement compensation frames are sometimes disposed. Therefore, the header 15b specifies the generating order of the ensuing controlled key frame indexes 16 and movement compensation frame indexes 17. Each header 15b is composed of 256 bits so that the key frame index 16 is expressed by, for example, bit 0 and the movement compensation frame index 17 is expressed by, for example, bit 1. For example, in a case of the first recording control unit 15a shown in FIG. 8, the indexes are arranged as key frame index 16 (KF1), movement compensation frame index 17 (MCF1), movement compensation frame index (MCF2), movement compensation frame index (MCF3), movement compensation frame index 17 (MCF4), key frame index 16 (KF20), . . . , movement compensation frame index 17 (MCF5), movement compensation frame index 17 (MCF6), . . . so that the bit of the header 15b (H1) is 01111011 . . . .

Figure 9:
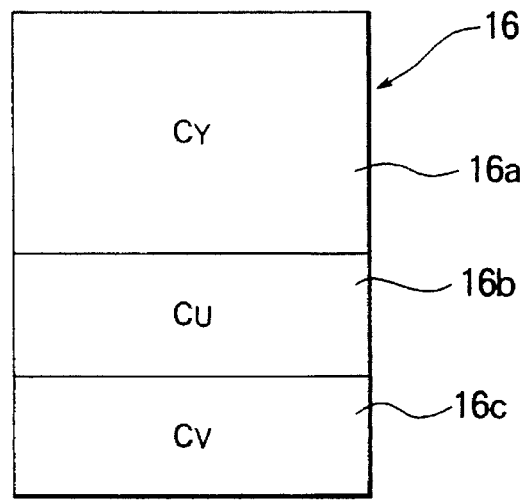
FIG. 9 is a block diagram which schematically illustrates the structure of each key frame index shown in FIG. 8.

FIG. 9 is a block diagram which schematically illustrates each key frame index shown in FIG. 8. Each key frame index 16 is composed of a Y-signal index region 16a ($C_y$), U-signal index region 16b ($C_u$) and V-signal index region 16c ($C_v$).

Figure 10:
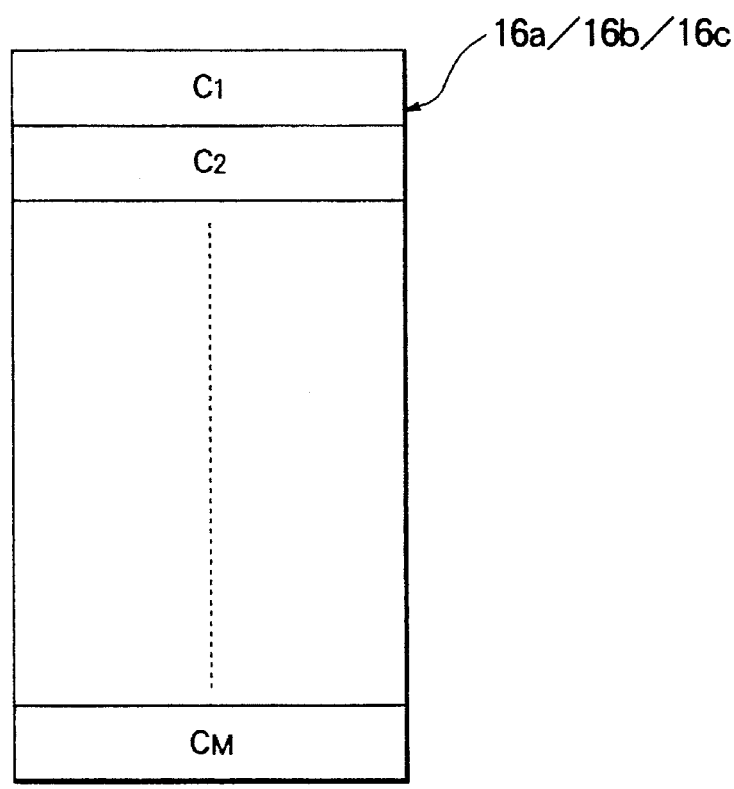
FIG. 10 is a block diagram which schematically illustrates a Y-signal index region (or a U-signal index region or a V-signal index region) constituting the key frame index shown in FIG. 9.

FIG. 10 is a block diagram which schematically illustrates the Y-signal index region (or U-signal index region or V-signal index region) constituting the key frame index shown in FIG. 9. As described above, the algorithm of the Kohonens self-organizing featured mapping enables the code book as shown in FIG. 4 and representing the block image pattern for each of the Y, U and V signals to be obtained. Furthermore, the procedure shown in FIG. 5 determines the representative vector number s with respect to each block 2 ($B_{ij}$) of each key frame from each code book. Therefore, in each Y-signal index region 16a (or the U-signal index region 16b or the V-signal index region 16c), the representative vector number $C_1, C_2, \ldots, C_M$ corresponding to the block $B_{ij}$ of each frame is recorded. For the Y-signal index region 16a, M=160×120=19200, and M=80×60=4800 for the U-signal index region 16b and the V-signal index region 16c. The representative vector numbers $C_1, C_2, \ldots, C_M$ for vector quantizing image information of each block correspond to blocks $B_{11}, B_{21}, \ldots, B_{12}, B_{22}, \ldots$.

Figure 11:
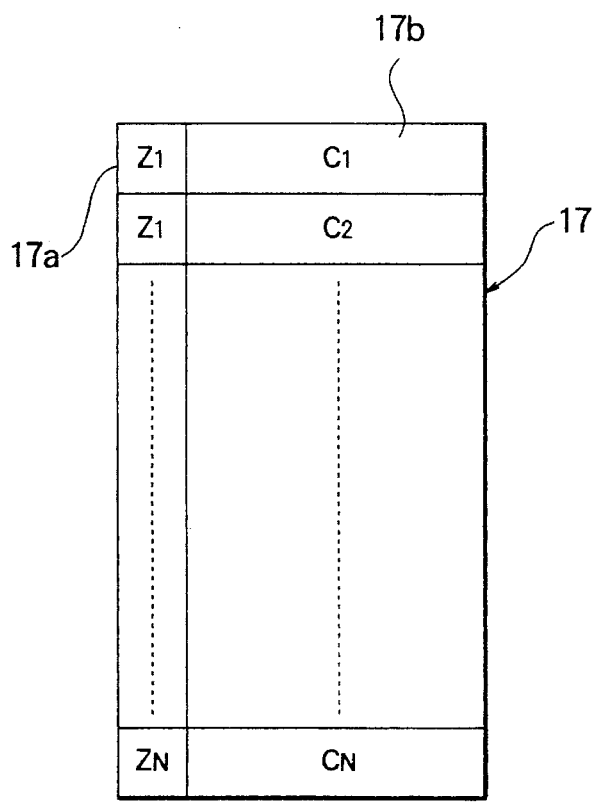
FIG. 11 is a block diagram which schematically illustrates the structure of each movement compensation frame index shown in FIG. 8.

FIG. 11 is a block diagram which schematically illustrates the structure of each movement compensation frame index shown in FIG. 8. As described above, the movement compensation frame is composed of a portion, in which the movement vector pattern information of the large block 14 is recorded with its representative vector number, and a portion in which the image information of the image block $B_{ij}$ is coded with its representative vector number by using the code book of the Y, U and V signals. Therefore, the representative vector number 17b, that is, $C_1, C_2, \ldots, C_n$, of each movement compensation frame index 17 has, at their leading portions, an identifying bit 17a, that is, $Z_1, Z_2, \ldots, Z_n$. Thus, whether the ensuing representative vector number 17b is the representative vector number of the movement vector pattern of the large block 14 or the representative vector number (that is, the representative vector number of the block using the image information) of the block image pattern of the Y, U and V signals is identified. For example, if the identifying bit 17a is zero, the ensuing representative vector number 17b is the movement vector pattern representative vector number of the large block 14. If the identifying bit 17a is 1, the same is the representative vector number of the block image pattern of the YUV signals. If all of the identifying bit 17a are zero, that is, if all representative vector numbers 17b are representative vector number of the movement vector pattern of the large block 14, the numbers $C_1, C_2, \ldots, C_N$ correspond to, for example, the large blocks 14, $Z_{11}, Z_{21}, \ldots, Z_{12}, Z_{22}, \ldots$. However, if the identifying bit 17a contains a portion that is 1 and a block using image information appears at a position corresponding to the large block 14 ($Z_{st}$) in the column $Z_{11}, Z_{21}, \ldots, Z_{12}, Z_{22}, \ldots$, the representative vector number (4×4=16, that is, 3×16=48 representative vector numbers for each of the signals Y, U and V) of each of the signals Y, U and V of each block Bij constituting the large block 14 ($Z_{st}$) is inserted into a corresponding position of the column $C_1, C_2, \ldots, C_N$.

Figure 12:
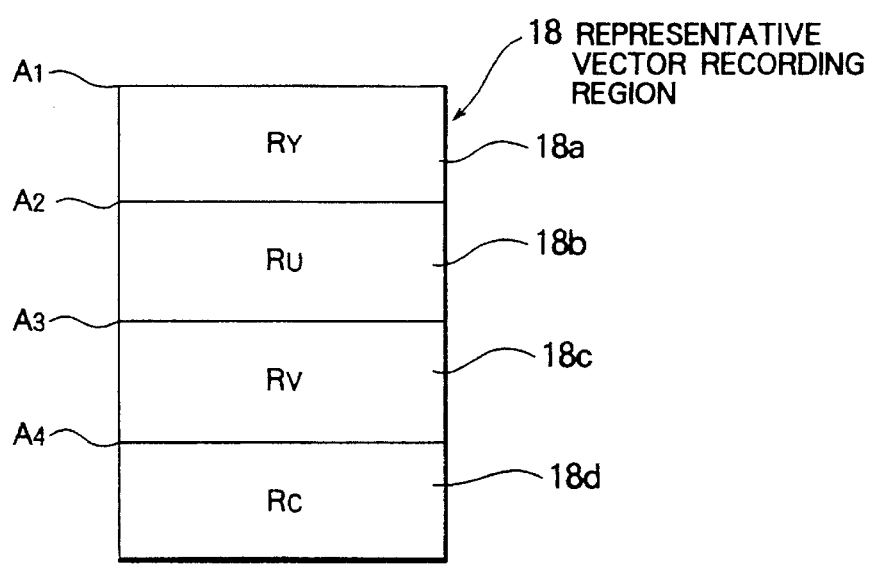
FIG. 12 is a block diagram which schematically illustrates the structure of a representative vector recording region (a code book recording region)

FIG. 12 is a block diagram which schematically illustrates the structure of a representative vector recording region (a code book recording region). A representative vector recording region 18 comprises a Y-signal block image pattern representative vector recording region 18a, a U-signal block image pattern representative vector recording region 18b, a V-signal block image pattern representative vector recording region 18c and a large block movement vector pattern representative vector recording region 18d. Each of the Y-signal signal block image pattern representative vector recording region 18a, the U-signal block image pattern representative vector recording region 18b, the V-signal block image pattern representative vector recording region 18c and the large block movement vector pattern representative vector recording region 18d starts at corresponding predetermined addresses $A_1, A_2, A_3$ and $A_4$.

Figure 13:
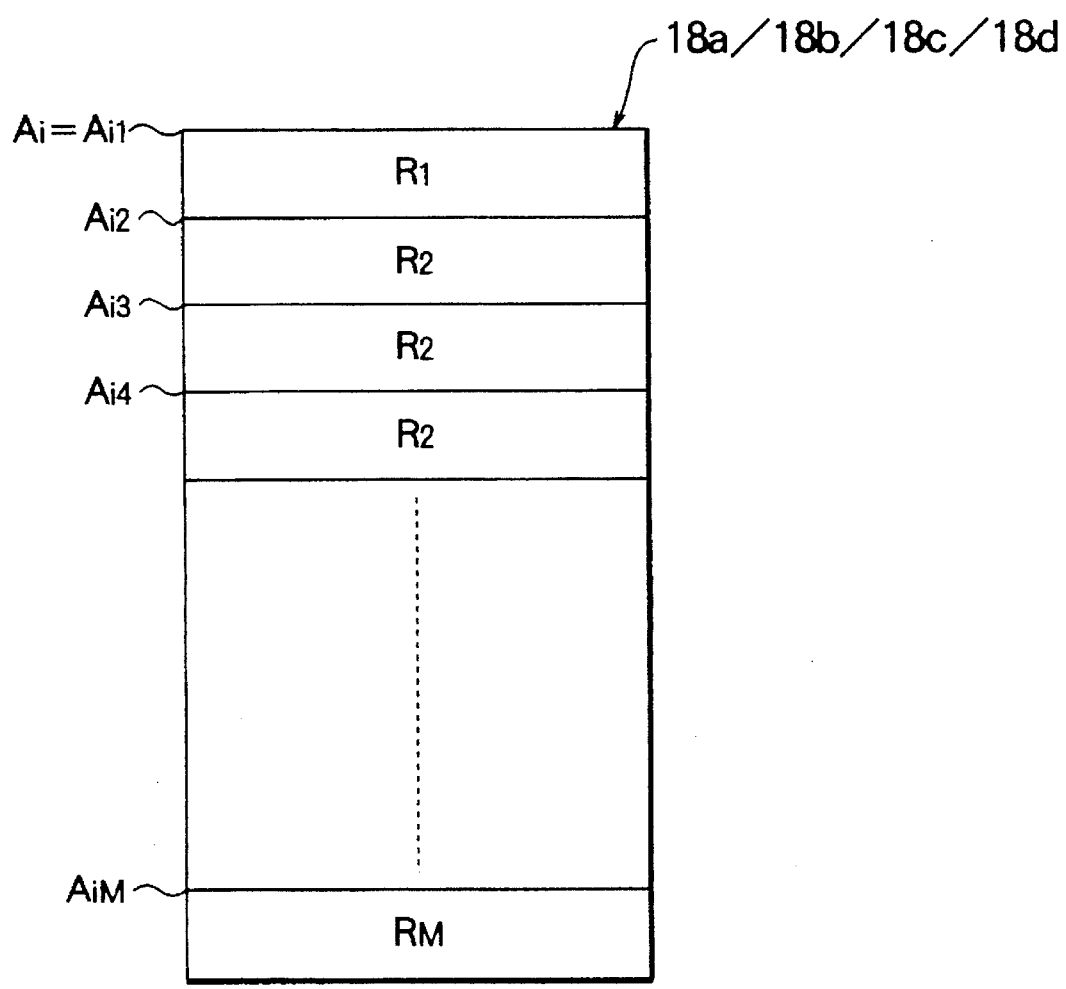
FIG. 13 is a block diagram which schematically illustrates the Y-signal block image pattern representative vector recording region 18a, the U-signal block image pattern representative vector recording region 18b, the V-signal block image pattern representative vector recording region 18c and the large block movement vector pattern representative vector recording region 18d shown in FIG. 12.

FIG. 13 is a block diagram which schematically illustrates the Y-signal block image pattern representative vector recording region 18a, the U-signal block image pattern representative vector recording region 18b, the V-signal block image pattern representative vector recording region 18c and the large block movement vector pattern representative vector recording region 18d. In the Y-signal block image pattern representative vector recording region 18a, the U-signal block image pattern representative vector recording region 18b and the V-signal block image pattern representative vector recording region 18c, information corresponding to the code books of the signals Y, U and V is recorded. In the large block movement vector pattern representative vector recording region 18d, information corresponding to the code book for the movement vector pattern of the large block 14 is recorded. Therefore, in a case of the Y-signal block image pattern representative vector recording region 18a, recording starts at $A_i = A_1$ and the block image pattern representative vectors $R_1, R_2, R_3, R_4, \ldots, R_M$ of the signal Y of the code book shown in FIG. 4 are sequentially recorded at addresses $A_{i1}, A_{i2}, A_{i3}, A_{i4}, \ldots, A_{iM}$. If one block contains 16 pixels and each pixel is expressed by 8 bits as described above, the Y-signal block image pattern representative vectors $R_1, R_2, R_3, R_4, \ldots, R_M$ can be expressed by, for example 6×8 bits=128 bits. Therefore, assuming that the address is expressed in bit units, the following relationships are held:

$A_{12} = A_{11} + 128$, and $A_{13} = A_{12} + 128$

. . .

Therefore, the recording address A1s of the representative vector $R_s$ corresponding to the representative vector number s can be calculated by the following equation:

$A_{1s} = A_1 + 128(s-1)$

The number M of the representative vector is, for example, 512. Also each of the U-signal block image pattern representative vector recording region 18b and the V-signal block image pattern representative vector recording region 18c is constituted similarly to the Y-signal block image pattern representative vector recording region 18a. The large block movement vector pattern representative vector recording region 18d is constituted similarly to the Y-signal block image pattern representative vector recording region 18a except that its representative vector Rs is composed of 11×32 bits=352 bits.

Figure 14:
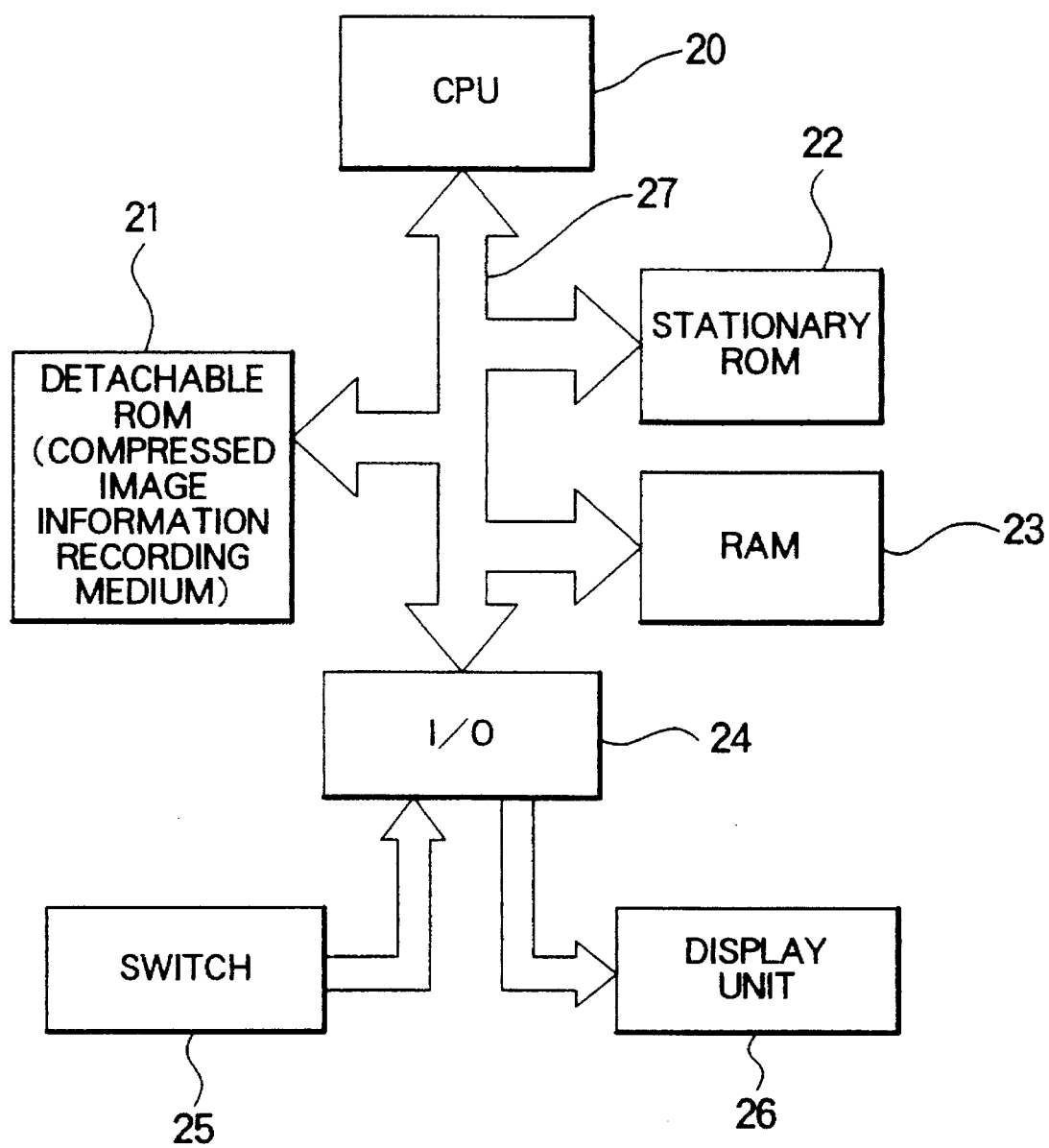
FIG. 14 is a block diagram which illustrates the physical structure of a compressed image information reproducing apparatus according to the present invention.

FIG. 14 is a block diagram which illustrates the physical structure of an apparatus for reproducing compressed image information according to the present invention. An apparatus for reproducing compressed image information according to this embodiment comprises a CPU 20, a detachable ROM (compressed image information recording medium) 21, a stationary ROM 22, a RAM 23, an input/output interface 24, a control switch 25 and a display unit 26. The CPU 20, the detachable ROM (compressed image information recording medium) 21, the stationary ROM 22, the RAM 23, the input/output interface 24 are mutually connected by a bus 27. The control switch 25 and the display unit 26 are connected to the CPU 20 through the input/output interface 24 and the bus 27.

The CPU 20 responds to the operation of a reproducing switch included in the control switch 25 to start decompressing and reproducing operation of compressed image information recorded in the detachable ROM (compressed image information recording medium) 21, the CPU 20 controlling reproduction of compressed image information as follows: in the detachable ROM (compressed image information recording medium) 21, compressed image information (the index recording regions and the representative vector recording region 18) shown in FIGS. 8 to 13 at predetermined addresses ($A_0$ and $A_1$). In the stationary ROM 22, a program for controlling a reproducing operation to be described later and the like are recorded. In the RAM 23, information required to decompress and reproduce compressed image information is temporarily recorded. The control switch 25 comprises, for example, the reproducing switch and a quit switch. The display unit 26 comprises, for example, a liquid crystal display unit or a cathode ray tube and operated in response to RGB signals to display an image.

Figure 15:
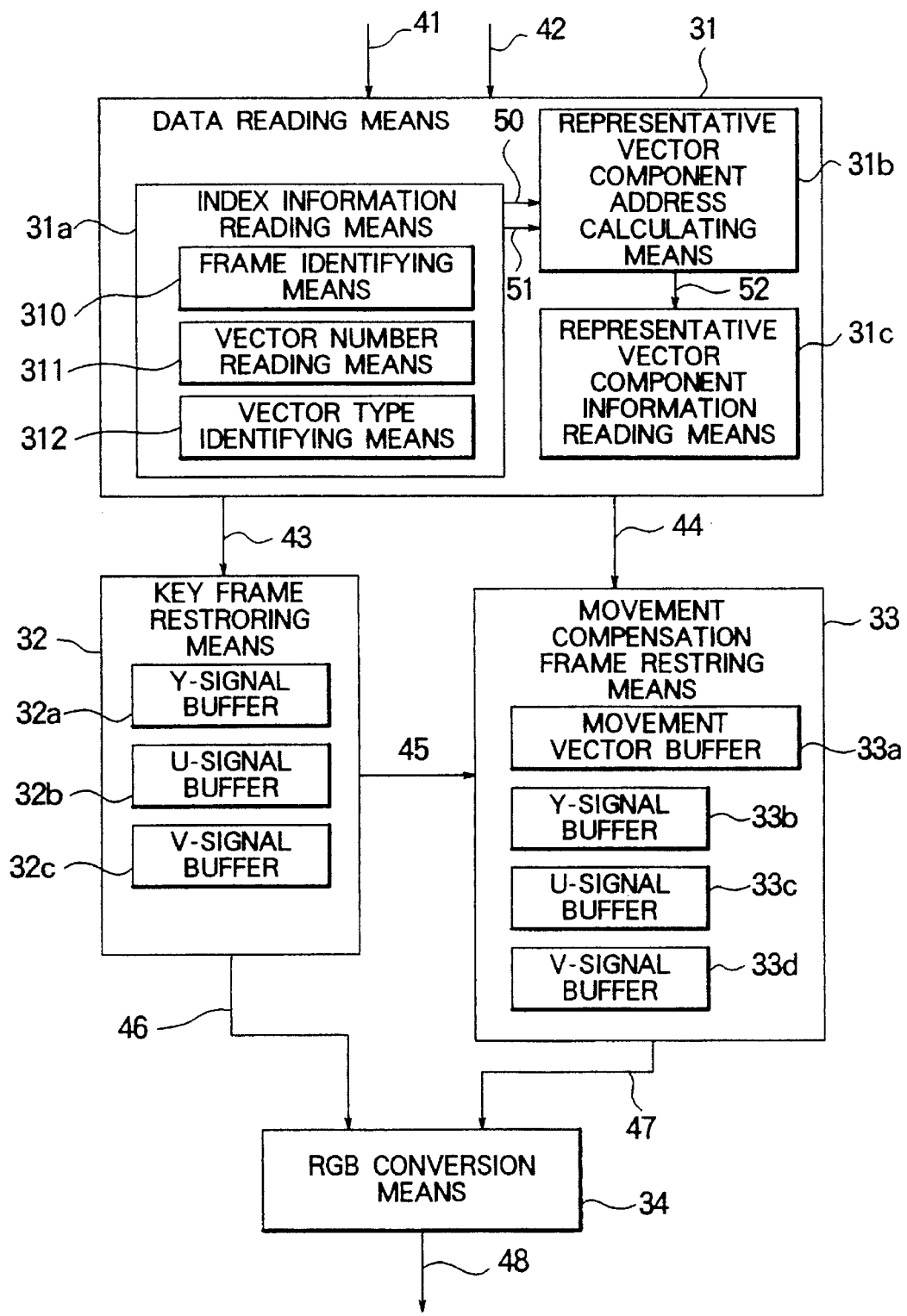
FIG. 15 is a block diagram which illustrates the functional structure of the compressed image information reproducing apparatus according to the present invention.

FIG. 15 is a block diagram which illustrates the functional structure of the apparatus for reproducing compressed image information according to the present invention. The apparatus for reproducing compressed image information according to this embodiment comprises, in terms of function, a data reading means 31, a key frame restoring means 32, a movement compensation frame restoring means 33 and an RGB conversion means 34. The means 31 to 34 are realized by the program recorded on the stationary ROM 22, and the operation of the means 31 to 34 are executed by the CPU 20.

The data reading means 31 comprises an index information reading means 31a, a representative vector-component address calculating means 31b and a representative vector component information reading means 31c. The index information reading means 31a comprises a frame identifying means 310, a vector number reading means 311 and a vector type identifying means 312.

The index information reading means 31a reads index information 41 recorded on the detachable ROM (compressed image information recording medium) 21. The frame identifying means 310 stores information of the header 15b included in the index information 41 to discriminate that the index information, which is being processed, is the key frame index 16 or the movement compensation frame index 17. The vector number reading means 311 sequentially reads the representative vector numbers included in the key frame index 16 and the movement compensation frame index 17 to transmit a representative vector number information 50 to the representative vector component address calculating means 31b. The vector type identifying means 312 discriminates whether the read representative vector number relates to the image pattern representative vector or to the movement vector representative vector. If it relates to the image pattern vector representative vector, the vector type identifying means 312 discriminates whether it relates to the image pattern representative vector of the Y, U or the V signal. The vector type identifying means 312 transmits the thus-obtained vector type information 51 to the representative vector component address calculating means 31b.

The representative vector component address calculating means 31b calculates the address in the representative vector representative vector recording region 18 corresponding to the representative vector number information 50 supplied by the vector number reading means 311 in accordance with the vector type information 51 supplied by the vector type identifying means 312 to transmit the thus-obtained address information 52 to the representative vector component information reading means 31c.

The representative vector component information reading means 31c reads the representative vector component information 42 in accordance with the address information 52 supplied by the representative vector component address calculating means 31b.

The data reading means 31 supplies, to the key frame restoring means 32, the key frame representative vector information 43 included in the representative vector component information 42 read by the representative vector component information reading means 31c, the data reading means 31 as well as supplying the movement compensation frame representative vector information 44 to the movement compensation frame restoring means 33.

The key frame restoring means 32 comprises a Y-signal buffer 32a, a U-signal buffer 32b and a V-signal buffer 32c to decompress Y, U and V signals of each key frame in accordance with the key frame representative vector information 43 supplied from the data reading means 31 so as to transmit restored YUV signal frame information 46 to the RGB conversion means 34.

The movement compensation frame restoring means 33 comprises a movement vector buffer 33a, a Y-signal buffer 33b, a U-signal buffer 33c and a V-signal buffer 33d to restore the Y, U and V signals of each movement compensation frame in accordance with the movement compensation frame representative vector information 44 supplied from the data reading means 31 so as to transmit the restored YUV signal frame information 47 to the RGB conversion means 34.

The RGB conversion means 34 linearly converts YUV signal frame information 46 and 47 supplied from the key frame restoring means 32 and the movement compensation frame restoring means 33 to transmit an obtained RGB signal 48 to the display unit 26 (if necessary through a digital-to-analog conversion means (not shown)). The buffers 32a, 32b, 32c, 33a, 33b, 33c and 33d of the key frame restoring means 32 and the movement compensation frame restoring means 33 are constituted by a predetermined memory region in the RAM 23.

The reproducing operation performed by the apparatus for reproducing compressed image information shown in FIGS. 14 and 15 will now be described with reference to FIG. 16.

Figure 16:
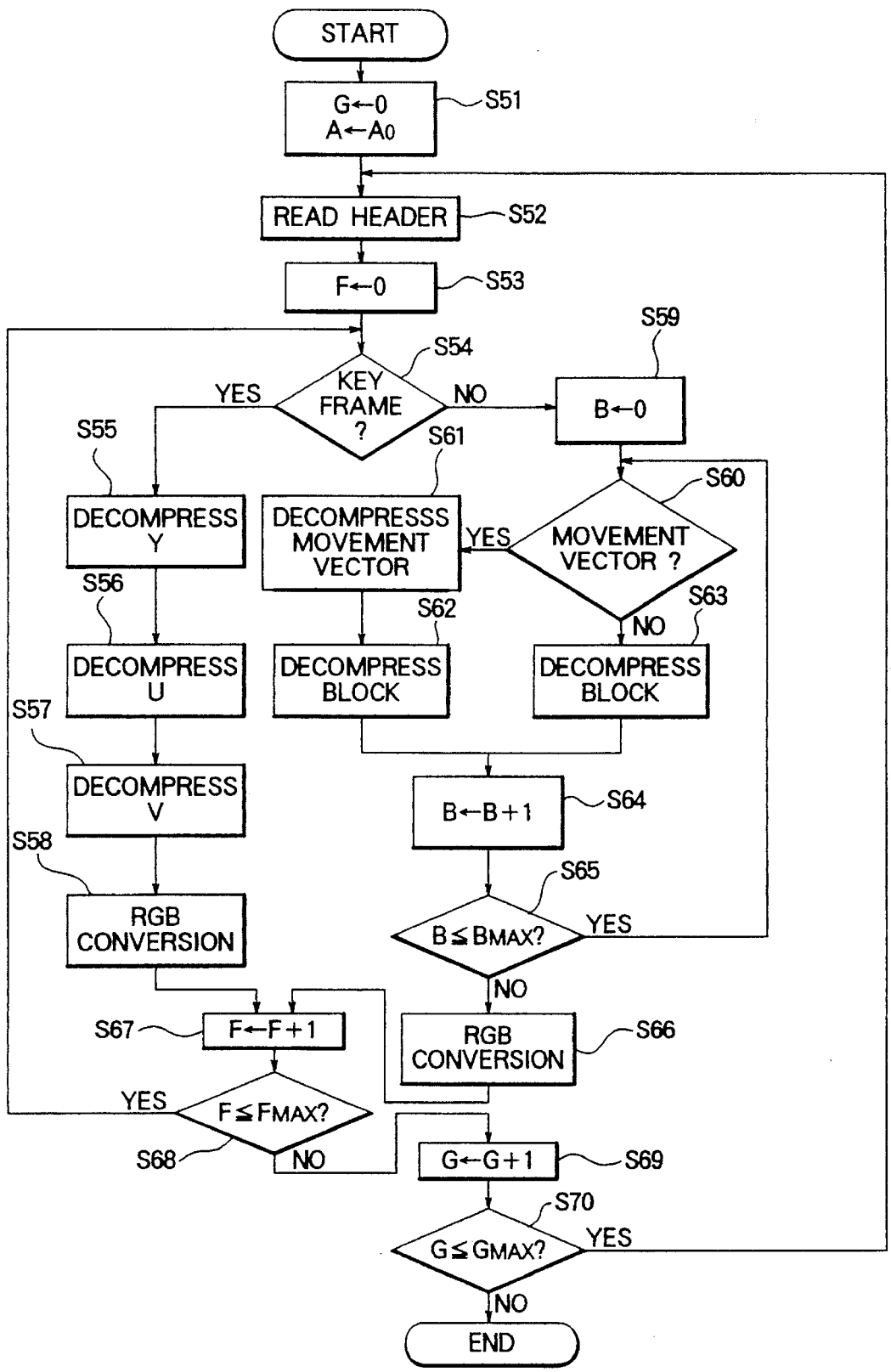
FIG. 16 is a flow chart showing a procedure for decompressing and reproducing compressed image information performed by the compressed image information reproducing apparatus shown in FIG. 15.

FIG. 16 is a flow chart showing the procedure for decompressing and reproducing compressed image information performed by the apparatus for reproducing compressed image information shown in FIG. 15. When, for example, the reproducing switch included in the control switch 25 is operated, the CPU 20 starts the procedure shown in FIG. 16. The procedure shown in FIG. 16 is performed by the CPU 20 in accordance with the program recorded on the stationary ROM 22.

In step S51 parameter G of the index information reading means 31a is initialized as G←0, and 0 is substituted. As described above, compressed image information recorded on the detachable ROM (compressed image information recording medium) 21 is divided into a multiplicity of the recording control units 15a for each frame and recorded on the index recording region 15. The parameter G is a parameter for holding the number of the recording control unit 15a which is being present, the parameter G being updated as G←G+1 in step S69 whenever the recording control unit 15a is processed. Furthermore, an address counter A of the index information reading means 31a is initialized to leading address A0 of the index recording region 15. The address counter A holds the address of the index recording region 15 which is being processed such that the address expressed in bit units is held in this embodiment.

The reproduction of compressed image information is performed by repeating steps S52 to S70. Each recording control unit 15a is processed in steps S52 to S68. Then, this process will now be described.

In step S52 the index information reading means 31a reads the header 15b of the index recording region 15 held in the address counter A and causes the information of the header 15b to be held in the buffer in the frame identifying means 310. Furthermore, the index information reading means 31a updates the address counter A such that A←A+256. As a result, in the address counter A, the addresses of the key frame index 16 and the movement compensation frame index 17 to be then processed are held. In step S53 the frame identifying means 310 initializes parameter F to zero. The parameter F holds information the position of the frame, which is being processed (the key frame index 16 or the movement compensation frame index 17), in the recording control unit 15a. The information is updated in step S67. If the number of the key frame indexes 16 and the movement compensation frame indexes 17 included in the recording control unit 15a exceeds $F_{MAX}$=256 in step S68, the operation proceeds to a process in which the next recording control unit 15a is processed.

In accordance with information of the header 15b and the value of the parameter F read in step S52, the frame identifying means 310 discriminates in step S54 that reference of the address held in the address counter A is made to the key frame index 16 or to the movement compensation frame index 17. That is, the frame identifying means 310 discriminates that it is the key frame index 16 if the F-th header information bit is 0. If the same is 1, the frame identifying means 310 discriminates that it is the movement compensation frame index 17. If a discrimination is made in step S54 that reference of the address counter A is made to the key frame index 16, the operation proceeds to step S55. If a discrimination is made that reference to the movement compensation frame index 17 is performed, the operation proceeds to step S59.

If a discrimination is made in step S54 that the frame to be then processed is the key frame index 16, the vector number reading means 311 sequentially reads the representative vector numbers recorded on the key frame index 16 to supply the representative vector number information 50 to the representative vector component address calculating means 31b. In accordance with the offset of the present address (the value of the address counter A) from the leading portion of the key frame index 16 which is being processed, the vector type identifying means 312 discriminates that the address counter A makes a reference the Y-signal index region 16a, the U-signal index region 16b or the V-signal index region 16c to transmit the vector type information 51 to the representative vector component address calculating means 31b.

The representative vector component address calculating means 31b calculates the representative vector address in accordance with the representative vector number information 50 and the vector type information 51 to transmit the address information 52 to the representative vector component information reading means 31c.

The representative vector component information reading means 31c sequentially reads the representative vector components in accordance with the address information 52 to supply the key frame representative vector information 43 to the key frame restoring means 32. In accordance with the key frame representative vector information 43 supplied from the data reading means 31, the key frame restoring means 32 restores image information of the key frame into the Y-signal buffer 32a, the U-signal buffer 32b and the V-signal buffer 32c.

Figure 17:
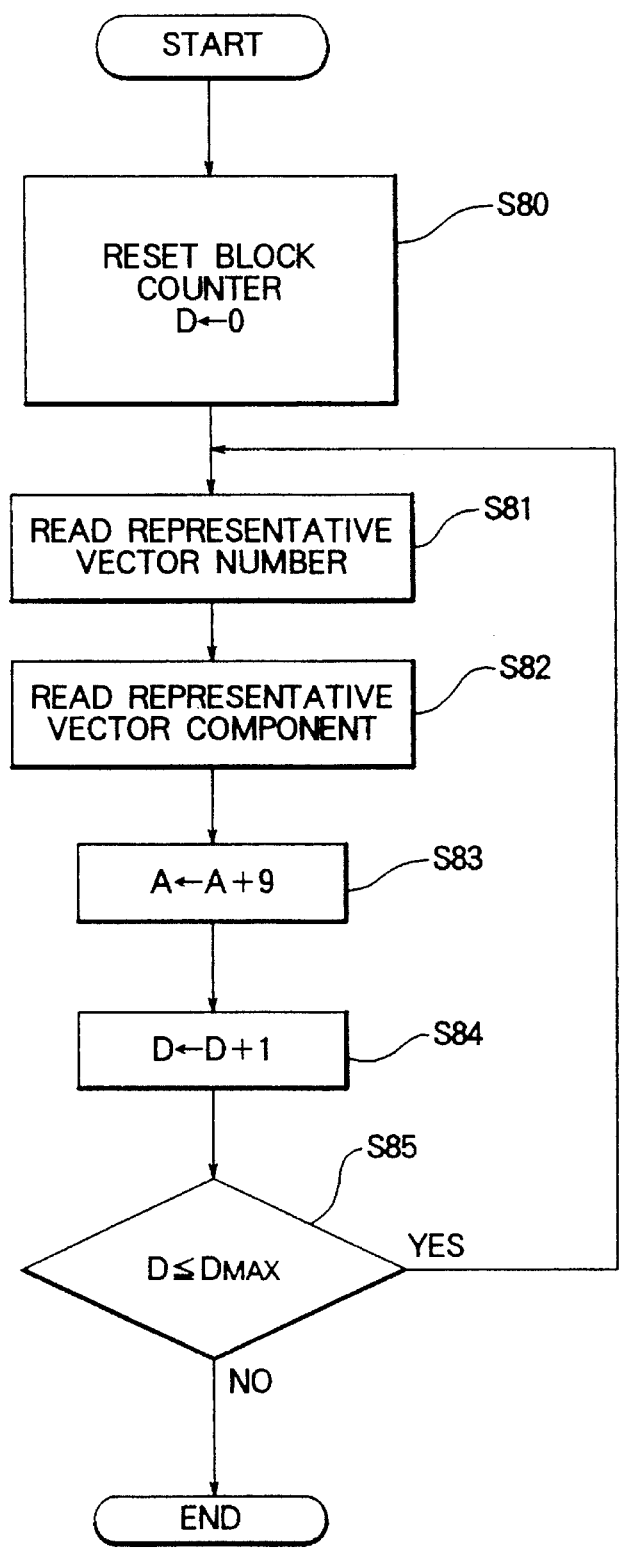
FIG. 17 is a flow chart showing a process of decompressing Y signal (or U signal or V signal) in the procedure shown in FIG. 16.

FIG. 17 is a flow chart showing the process for decompressing the signal Y (decompressing the signal U or signal V) in accordance with the procedure shown in FIG. 16. The decompression of the signal Y in step S55 is performed as follows in accordance with the procedure shown in FIG. 17.

In step S80 the data reading means 31 resets a block counter D such that D←0. As described above, the signal Y of the key frame is divided into 160×120 blocks $B_{ij}$, and the Y-signal index region 16a holds representative vector numbers $C_1, C_2, \ldots$, corresponding to $B_{11}, B_{21}, \ldots, B_{12}, B_{22},$ ... recorded thereon. The block counter D holds the position (that is, the subscript i of $C_i$) of the representative vector number which is being processed.

In step S81 the data reading means 31 reads the representative vector number recorded at the address to which the address counter A makes a reference to transmit the representative vector number information 50 to the representative vector component address calculating means 31b. In accordance with the vector type information 51 supplied from the vector type identifying means 312, the representative vector component address calculating means 31b calculates the representative vector component address corresponding to the representative vector number. The calculation is performed as follows.

In step S55 the vector type identifying means 312 transmits the vector type information 51 indicating that the address counter A is making a reference to the Y-signal index region 16a. As described with reference to FIG. 13, each representative vector $R_1, R_2, \ldots$ of the Y-signal block image pattern is composed of 16×8 bits=128 bits. Therefore, assuming that the representative vector number s read in step S81 is $C_i$=s, the address of the representative vector component corresponding to the representative vector number can be calculated such that $A_1+128\times(s-1)$, where $A_1$ is the leading address of the Y-signal block image pattern representative vector recording region 18a. Therefore, the representative vector component address calculating means 31b transmits $A_1+128\times(s-1)$ to the representative vector component information reading means 31c as the address information 52.

In step S82 the representative vector component information reading means 31c reads the component of the representative vector recorded in 128 bits, the leading portion of which is the foregoing address, so as to supply it as the key frame representative vector information 43 to the key frame restoring means 32. The key frame restoring means 32 sequentially stores the supplied representative vector components at predetermined positions in the Y-signal buffer 32a so that the signal Y of the key frame is restored.

In step S83 nine bits (the bit length of each representative vector number $C_1, C_2, \ldots$) are added to the address counter A to update the address counter A. Furthermore, 1 is added to the block counter D to update the block counter D. In addition, the index information reading means 31a discriminates in step S85 whether or not all blocks have been processed, that is, discriminates whether or not the value of the block counter D is smaller than $D_{MAX}=160\times120=19200$. If non-processed block is present, that is, if $D \leq D_{MAX}$, the operation returns to step S81, and the operations in steps S81 to S84 are repeated.

After the step S55 has been completed, all pixels of the signal Y of the key frame are restored in the Y-signal buffer 32a. Also the decompression of the signals U and V to be performed in steps S56 and S57 is performed similarly to the decompression of the signal Y performed in step S55. However, in accordance with the vector type information 51 transmitted by the vector type identifying means 312, the representative vector component address calculating means 31b uses, as the leading address, leading address $A_2$ of the U-signal block image pattern representative vector recording region 18b in place of $A_1$ in step S56, and uses leading address $A_3$ in step S57. In steps S56 and S57, $D_{MAX}=80\times 60=4800$.

As described above, the YUV signals of the key frame are decomposed and restored in the Y-signal buffer 32a, U-signal buffer 32b and V-signal buffer 32c. In step S58 the restored YUV signal frame information 46 is supplied from the key frame restoring means 32 to the RGB conversion means 34. The RGB conversion means 34 converts the YUV signal frame information 46 into the RGB signal 48 in accordance with the YUV signal frame information 46.

If a discrimination has been made in step S54 that the movement compensation frame index 17 is then processed, image information of the movement compensation frame is decomposed and restored in accordance with procedures in steps S59 to S66 as described below.

In step S59 the index information reading means 31a initializes a large block counter B to zero. The large block counter B is a counter for storing the position of the large block 14, which is being processed, in the movement compensation frame. After step S59 has been completed, the data reading means 31 and the movement compensation frame restoring means 33 repeat steps S60 to S65 to restore the YUV signals of the movement compensation frame in the Y-signal buffer 33b, the U-signal buffer 33c and the V-signal buffer 33d. Then, steps S60 to S64 will now be described.

In step S60 the vector number reading means 311 reads the identifying bit 17a and the representative vector number 17b (see FIG. 11) recorded in 10 bits, the leading portion of which is the address specified by the address counter A. In accordance with the read identifying bit 17a, the vector type identifying means 312 discriminates whether the read representative vector number 17b is the representative vector number of the movement vector pattern of the large block 14 or the representative vector of the block image pattern. If the identifying bit 17a is 0, a discrimination is made that the ensuing representative vector number 17b is the representative vector number of the movement vector pattern of the large block 14, and the operation proceeds to steps S61 and S62. If the identifying bit 17a is 1, a discrimination is made that the representative vector number 17b is the representative vector the block image pattern and the operation proceeds to step S63.

In step S61 the vector type identifying means 312 transmits the vector type information 51 indicating that the representative vector number, which is being read, is the representative vector number of the movement vector pattern of the large block 14 to the representative vector component address calculating means 31b in accordance with the result of the discrimination in step S60. The representative vector component address calculating means 31b calculates the representative vector component address such that $A_4+K\times(s-1)$ accordance with the foregoing vector type information 51, where A4 is the leading address of the large block movement vector pattern representative vector recording region 18d and constant K is the number of bits (for example, $K=11\times 32=352$) constituting each representative vector of the large block movement vector pattern representative vector recording region 18d. The representative vector component address calculating means 31b transmit the address calculated by the foregoing equation as the address information 52 to the representative vector component information reading means 31c. The representative vector component information reading means 31c reads K bits from the address $A_4+K\times(s-1)$ in accordance with the address information 52 to supply it as the movement compensation frame representative vector information 44 to the movement compensation frame restoring means 33. The movement compensation frame restoring means 33 holds the movement compensation frame representative vector information 44 in the movement vector buffer 33a.

In step S62 the movement compensation frame restoring means 33 determines the position of the large block 14, which is being processed, in the frame in accordance with the value of the large block counter B and as well as determines the position of each block $B_{ij}$ constituting the large block in the frame in accordance with the position of the large block 14. The movement compensation frame restoring means 33 refers to the movement vector component $V_{ij}=(v_{ij1}, v_{ij2})$ corresponding to each block $B_{ij}$ held in the movement vector buffer 33a to read the YUV signals of the corresponding pixels obtained by correcting the position of the pixels $P_{kl}$ constituting each block $B_{ij}$ in the frame with the movement vector component $V_{ij}=(v_{ij1}, v_{ij2})$ from the Y-signal buffer 32a, the U-signal buffer 32b and the V-signal buffer 32c to hold the YUV signals at corresponding positions in the Y-signal buffer 33b, the U-signal buffer 33c and the V-signal buffer 33d.

In the case of the signal Y, the corresponding pixel positions in the Y-signal buffer 32a are calculated as follows: an assumption is made that the pixel constituting the block $B_{ij}$ is $P_{kl}$. Note that the subscripts k and 1 ($1 \leq k \leq 640$, $1 \leq l \leq 480$) indicate the position of the pixel $P_{kl}$ in the Y-signal image frame. Assuming that the corresponding pixel of the pixel $P_{kl}$ in the Y-signal buffer 32a is $P_{mn}$, $m=k-v_{ij1}$, $n=l-v_{ij2}$.

Also the signals U and V are processed such that the position of each pixel constituting each block $B_{ij}$ of the large block is corrected by using the movement vector $V_{ij}$ so that the corresponding positions in the U-signal buffer 32b and the V-signal buffer 32c are determined. The signals U and V of the pixel at the corresponding position are read from the U-signal buffer 32b and the V-signal buffer 32c so as to be restored to the corresponding positions for the block $B_{ij}$ in the U-signal buffer 33c and the V-signal buffer 33d.

If a discrimination has been made in step S60 that the representative vector number relates to the block image information pattern of the YUV signals, the operation proceeds to step S63 in which the YUV signals of 4×4=16 image blocks Bij (see FIG. 7) contained in the large block 14 corresponding to the value held in the large block counter B are restored by similar methods in steps S55 to S57. In step S83 in the procedure shown in FIG. 17, the address counter A is increased by 10 (corresponding to 10 bits composed of 1 bit of the identifying bit 17a and 9 bits of the representative vector number 17b). In step S85 $D_{MAX}$ is 4×4=16 and each of the YUV signals is subjected to the procedure shown in FIG. 17.

As described above, the YUV signals corresponding to the value held in the large block counter B are restored in the Y-signal buffer 33b, the U-signal buffer 33c and the v-signal buffer 33d in steps S61, S62 or S63. In step S64, the large block counter B is updated (B←B+1). In step S65 whether or not non-processed large block 14 is left (that is, whether or not $B ≦ B_{max}$=40×30=1200 is satisfied) is discriminated. If non-processed large block 14 is left, the operation returns to step S60, and steps S60 to S64 are repeated.

After all large blocks 14 have been processed, the operation proceeds to step S66 in which the movement compensation frame restoring means 33 transmits the YUV signals restored in the Y-signal buffer 33b, the U-signal buffer 33c and the V-signal buffer 33d to the RGB conversion means 34 as the YUV signal frame information 47. The RGB conversion means 34 linearly converts the YUV signal frame information 47 so that the RGB signals 48 are obtained.

As described above, the procedure in steps S54 to S66 processes the key frame index 16 and the movement compensation frame index 17. In step S67 the parameter F is updated (F←F+1). In step S68 whether or not the key frame index 16 and the movement compensation frame index 17 contained in the recording control unit 15a is left (whether or not $F ≦ F_{MAX}$ is satisfied) is discriminated. If leaving has been confirmed in step S68, the operation returns to step S54, and steps S54 to S67 are repeated.

If a discrimination has been made in step S68 that all key frame indexes 16 and the movement compensation frame indexes 17 of the recording control unit 15a have been processed, the operation proceeds to step S69 in which the parameter G is updated (G←G+1). In step S70 whether or not non-processed recording control unit 15a is left (whether or not G23 $G_{MAX}$ is satisfied) is discriminated. If leaving has been discriminated in step S70, the operation returns to step S52, and steps S53 to S69 are repeated. As a result, the key frame indexes 16 and the movement compensation frame indexes 17 of all recording control units 15a contained in the index recording region 15 can be decomposed and reproduced.

As described above, the method of compressing image information according to the present invention enables image information, in particular, dynamic image information, to be compressed efficiently. In an example case where dynamic image information composed of Y-signal frame composed of 640×480 pixels and U and V-signal frames each composed of 320×240 pixels is compressed, each movement compensation frame can be coded by 40×30×9= 10800 bits (1350 bytes) if the movement vector can be determined for all blocks. The signal Y of the key frame can be coded by 160×120×9=172800 bits, while the signals U and V can be coded by 80×60×9=43200 bits. Since one code book is required for the block image pattern vector and the movement vector pattern vector for each of the YUV signals, image information can be compressed significantly.

The compressed image information recording medium according to the present invention according to the present invention enables a recording medium capable of recording the significantly compressed image information to be realized. Furthermore, the apparatus for reproducing compressed image information according to the present invention enables compressed image information recorded on the compressed image information recording medium to be read at high speed to be reproduced in a short time.

What is claimed is:

1. An image information compressing method for compressing dynamic image information composed of a plurality of image frames, said method of compressing image information comprising the steps of:

(a) determining a plurality of image frames constituting said dynamic image information as key frames or movement compensation frames;

(b) dividing said plurality of image frames into a plurality of blocks each of which is composed of a predetermined number of pixels in a vertical direction and those in a horizontal direction;

(c) determining a movement vector of each block of said movement compensation frame determined in said step (a) with respect to an immediately forward key frame;

(d) dividing each of said movement compensation frames into large blocks each of which is composed of a predetermined number of said blocks in the vertical direction and those in the horizontal direction so as to obtain a plurality of movement vector pattern vectors by scanning each of said large blocks;

(e) determining a plurality of representative vectors that represent said plurality of movement vector pattern vectors obtained in said step (d) so as to make a code book for vector-quantizing said movement compensation frame of said dynamic image information; and (f) selecting one representative vector that represents said movement vector pattern vector obtained in said step (d) from said code book made in said step (e) to code said movement vector pattern vector with the number of said selected representative vector.

2. An image information compressing method according to claim 1 wherein said step (e) comprising the steps of:

(e1) initializing load vectors for respectively connecting, to a plurality of units input vectors of the same dimension as the dimension of said sample movement vector pattern vector that are load vectors of a plurality of units disposed at lattice points in a space of three or more dimensions;

(e2) calculating the distance from one of said movement vector pattern vectors obtained in step (d) to each of said load vectors;

(e3) determining a winner unit that gives a minimum value of said distances calculated in step (e2) to update the load of a unit in the neighborhood of said winner unit; and (e4) repeating steps (e2) and (e3) for said plurality of movement vector pattern vectors to make said code book, the representative vector of which is the load vector of each unit obtained due to said repetition.

3. An image information compressing method according to claim 1 wherein each of said key frames determined in step (a) is subjected to a process comprising the steps (g) dividing said plurality of key frames into a plurality of blocks each of which is composed of a predetermined number of pixels in a vertical direction and those in a horizontal direction;

(h) scanning each block of each of said key frames to obtain a block image pattern vector;

(i) initializing load vectors for respectively connecting, to a plurality of units input vectors of the same dimension as the dimension of said block image pattern vector that are load vectors of a plurality of units disposed at lattice points in a space of three or more dimensions;

(j) calculating the distance from one of said block image pattern vectors obtained in step (h) to each of said load vectors;

(k) determining a winner unit that gives a minimum value of said distances calculated in step (j) to update the load of a unit in the neighborhood of said winner unit;

(l) repeating steps (j) and (k) for said plurality of block image pattern vectors to determine a load vector of each unit obtained due to said repetition as a representative vector so as to make a code book for vector-quantizing image information of said key frame; and (m) selecting a representative vector that represents said block image pattern vector of each block of said key frame from said code book to code said block image pattern vector with the number of said selected representative vector.

4. A compressed image information recording medium for recording dynamic image information compressed by said image information compressing method according to claim 3, said compressed image information recording medium comprising:

an index recording region for recording said representative vector number determined in steps (f) and (m); and a representative vector recording region for recording said code book made in steps (e) and (l) at predetermined addresses thereof.

5. A compressed image information reproducing apparatus for reproducing dynamic image information recorded on said compressed image information recording medium according to claim 4, said compressed image information reproducing apparatus comprising:

vector number reading means for reading a representative vector number recorded on said index recording region;

representative vector component address calculating means for calculating a representative vector component address corresponding to said representative vector number of said code book in accordance with said representative vector number read by said vector number reading means;

representative vector component information reading means for reading a representative vector component corresponding to said representative vector component address calculated by said representative vector component address calculating means;

key frame restoring means for restoring a key frame in accordance with said representative vector component read by said representative vector component information reading means; and movement compensation frame restoring means for restoring a movement compensation frame in accordance with said representative vector component read by said representative vector component information reading means.

6. An image information compressing method for compressing image information composed at least one image frame, said image information compressing method comprising the steps of:

(o) dividing a plurality of sample image frames into a plurality of blocks each of which is composed of a predetermined number of pixels in a vertical direction and those in a horizontal direction;

(p) scanning each block of said sample image frames to obtain a plurality of sample block image pattern vectors of a predetermined dimension;

(q) initializing load vectors for respectively connecting, to a plurality of units, input vectors of the same dimension as the dimension of said sample block image pattern vector that are load vectors of a plurality of units disposed at lattice points in a space of three or more dimensions;

(r) calculating the distance from one of sample block image pattern vectors obtained in step (p) to each load vector;

(s) determining a winner unit that gives a minimum value of said distances calculated in step (r) to update the load of a unit in the neighborhood of said winner unit;

(t) repeating steps (r) and (s) for each sample block image pattern vector and selecting the thus-obtained load vector of each unit as a representative vector to make a code book for vector-quantizing said image information; and (u) vector-quantizing said image frame of said image information by using said code book to code said image frame.

* * * * *